United States Patent [19]

Hansen et al.

[11] Patent Number: 4,498,134
[45] Date of Patent: Feb. 5, 1985

[54] SEGREGATOR FUNCTIONAL PLANE FOR USE IN A MODULAR ARRAY PROCESSOR

[75] Inventors: Siegfried Hansen; Jan Grinberg, both of Los Angeles; Robert D. Etchells, Topanga, all of Calif.

[73] Assignee: Hughes Aircraft Company, El Segundo, Calif.

[21] Appl. No.: 342,671

[22] Filed: Jan. 26, 1982

[51] Int. Cl.³ ............................................. G06F 15/16
[52] U.S. Cl. ................................................. 364/200
[58] Field of Search .............................. 364/200, 900

[56] References Cited

U.S. PATENT DOCUMENTS

| | | | |
|---|---|---|---|
| 3,701,976 | 10/1972 | Shively | 364/200 |
| 3,979,728 | 9/1976 | Reddaway | 364/200 |
| 4,065,808 | 12/1977 | Schomberg et al. | 364/200 |
| 4,174,514 | 11/1979 | Sternberg | 364/200 |
| 4,251,861 | 2/1981 | Mago | 364/200 |
| 4,270,169 | 5/1981 | Hunt et al. | 364/200 |
| 4,270,170 | 5/1981 | Reddaway | 364/200 |
| 4,374,414 | 2/1983 | Comfort et al. | 364/200 |
| 4,384,273 | 5/1983 | Ackland et al. | 364/900 |
| 4,388,686 | 6/1983 | Haid | 364/200 |
| 4,412,285 | 10/1983 | Neches et al. | 364/200 |
| 4,412,303 | 10/1983 | Barnes et al. | 364/900 |

*Primary Examiner*—Gareth D. Shaw
*Assistant Examiner*—Jameson Lee
*Attorney, Agent, or Firm*—G. B. Rosenberg; W. J. Bethurum; A. W. Karambelas

[57] ABSTRACT

A Segregator Functional Plane capable of dynamically segregating any number, or subset, of a Modular Array Processor's functional planes, either in terms of control or data exchange, or both, from the remainder. This is provided by interspersing a number of Segregator Functional Planes throughout the Array Processor so that a Segregator Functional Plane is architecturally located between each of the adjacent subsets of the Array Processor's functional planes. The Segregator Functional Plane nominally includes an array of pseudomodules that corresponds to the module arrays of the other functional planes of the Array Processor so that a pseudo-module is architecturally present between correspondingly adjacent modules of each Elemental Processor. These pseudo-modules are comprised of switches that may be commonly activated to functionally sever their respective Elemental Processor data bus lines. The Segregator Functional Plane also includes a second set of commonly activatable switches for functionally severing each of the Address Bus, Control Bus, Clock, Address Valid, and Configuration Latch Reset lines. Further, a third set of commonly activatable switches are included within the Segregator Functional Plane for functionally severing the input and output data lines that interconnect the Control and Array Processors.

9 Claims, 21 Drawing Figures

SEGREGATOR FUNCTIONAL PLANE FOR USE IN A MODULAR ARRAY PROCESSOR

CROSS-REFERENCE TO RELATED APPLICATIONS (1) U.S. patent application Ser. No. 342,630 filed of even date herewith entitled "An Array Processor Architecture Utilizing Modular Elemental Processors", J. Grinberg et al., assigned to the assignee of the present invention.

(2) U.S. patent application Ser. No. 342,639 filed of even date herewith entitled "Modular Input-Programmable Logic Circuits for Use in a Modular Array Processor", S. Hansen et al. assigned to the assignee of the present invention.

(3) U.S. patent application Ser. No. 342,640 filed of even date herewith entitled "Data Exchange Subsystem for Use in a Modular Array Processor", S. Hansen, assigned to the assignee of the present invention.

BACKGROUND OF THE INVENTION

The present invention generally relates to the field of computer aided data analysis and, in particular, to the highly specialized computers capable of processing two dimensionally structured data sets, generally referred to as images, that are known as Cellular Array Processors (CAP).

In the field of image processing, the Cellular Array Processor is generally well known as a type of computer system whose architecture is particularly suited for the task of image processing. Although the specific design may differ substantially between different implementations, the general architecture of the Cellular Array Processor is quite distinctive. Typically, a system will include a highly specialized Array Processor that is controlled by a Control Processor of conventional design. The Array Processor, in turn, is formed from a large number of elemental processors that are distributed as individual cells within a regular matrix. (This gives rise to the descriptive name "Cellular Array Processor".) The elemental processor are essentially identical and generally contain a function-programmable logic circuit and memory register. The programmable logic circuit is typically capable of selectively performing a limited number of primitive logic and arithmetic functions, such as "and", "or", "invert", and "rotate" on the data stored in its respective memory register in conjunction with data provided by the Control Processor. The Control Processor is linked to the Elemental Processors via a common instruction bus. Thus, all of the elemental processors operate separately, yet synchronously, in the performance of a common logical function on the data contained in their respective memory registers. (This is commonly referred to as Single Instruction, Multiple Data, or SIMD operation.)

Cellular Array Processor systems are particularly well suited for image processing applications, since the memory registers present in the cellular array permit the digital representation of the image to be mapped directly into the processor. Thus, the spatial interrelationship of the data within the two-dimensionally structured data set is intrinsically preserved. By directing the Array Processor to perform a selected sequence of SIMD logical operations corresponding to the performance of a desired image processing algorithm, the data at every point in the image can be processed essentially in parallel. Naturally, both the effective processing speed (the product of the number of instructions per second executed by an Elemental Processor and the number of Elemental Processors operating simultaneously) and the resolution of the image being processed can be increased directly by the use of additional elemental processors.

Although the Cellular Array Processor architecture is a relatively recent development within the more general field of computer aided data analysis, a substantial number of systems utilizing the architecture have been developed. While many of the systems were specifically designed for general application purposes, quite a number have been designed for considerably more specialized applications. Descriptions of a number of the general application systems can be found in S. F. Reddaway, DAP - A Distributed Processor, IEEE, Proceedings of the First Symposium on Computer Architecture, pp. 61–65 (1973), General Purpose Array Processor, U.S. Pat. No. 3,815,095 issued to Aaron H. Wester on June 4, 1974, K. E. Batcher, Array Processor, U.S. Pat. No. 3,979,728 issued to Stewart Reddaway on Sept. 7, 1976, The Massively Parallel Processor (MPP) System, AIAA, Proceedings of The Computers in Aerospace Conference 2, pp. 93–97 (1979), and Parallel Type Processor with a Stacked Auxiliary Fast Memories, U.S. Pat. No. 4,144,566 issued to Claude Timsit on Mar. 13, 1979. A number of the more specialized systems are described in Floating Point Arithmetic Unit for a Parallel Processing Computer, U.S. Pat. No. 3,701,976 issued to Richard Shivety on Oct. 31, 1972 Network Computer System, U.S. Pat. No. 4,065,808 issued to Hermann Schomberg et al on Dec. 27, 1977 and Scientific Processor, U.S. Pat. No. 4,101,960 issued to Richard Stokes et al on July 18, 1978.

In each of these system implementations, a significantly different elemental processor design is used in order to tailor the array processors for their anticipated applications. This is principally due to the extremely wide variety of their possible applications and equally wide variety of subcomponents that can be utilized. However, a common feature of these elemental processors is that a high degree of component interconnection is used in order to optimize the elemental processor processing speed.

The particular disadvantage of using highly optimized elemental processor designs is that any significant change in the anticipated data processing application will require the elemental processors to be substantially redesigned in order to preserve the system's overall data processing capability and efficiency. This is a practical consequence of the fact that the subcomponents are too highly specialized and innerconnected to allow any significant alteration or extension of the elemental processors' component composition.

SUMMARY OF THE INVENTION

An Array Processor architecture utilizing a distinctly modular Elemental Processor design is disclosed in the principle copending companion application "An Array Processor Architecture Utilizing Modular Elemental Processors" Ser. No. 342,630.

The Array Processor is comprised of a plurality of modular Elemental Processors. A Data Exchange Subsystem interconnects the modules of each Elemental Processor to provide for data transfer. These modules are of a number of different functional types, such as memory and accumulator. Each module nominally includes an input-programmable logic circuit and a closely associated memory register. The modules of the Array Processor are associated so that the Elemental Processors are architecturally parallel to one another. The transfer of data within the Array Processor, based on the simultaneous transfer of data via the Data Exchange Subsystems of the Elemental Processors, is thereby correspondingly parallel. The modules are also architecturally associated as functional planes lying transverse to the Elemental Processors. A functional plane is thereby comprised of an array of modules that are each otherwise associated with a separate Elemental Processor. Further, the modules of a functional plane are of a common functional type. This allows the data of a two-dimensionally structured data set, as present within the memory registers of a functional plane's modules, to be processed identically and in parallel by successively passing the data set to functional planes of selected functional types.

A Control Processor is utilized to direct the operation of the Array Processor. They are interconnected by means of an Array/Control Processor Interface that allows the Control Processor to randomly address and configure each of the Array Processor's functional planes. It also allows the Control Processor to exchange data with the Array Processor.

The present invention provides a means for dynamically segregating any number, or subset, of the Array Processor's functional planes, either in terms of control or data exchange, or both, from the remainder. This is provided, in accordance with the present invention, by interspersing a number of Segregator Functional Planes throughout the Array Processor such that a Segregator Functional Plane is architecturally located between each of the adjacent subsets of the Array Processor's functional planes. The Segregator Functional Plane nominally includes an array of pseudo-modules that corresponds to the module arrays of the other functional planes of the Array Processor such that a pseudo-module is architecturally present between correspondingly adjacent modules of each Elemental Processor. These pseudo-modules are comprised of switches that may be commonly activated to electrically sever their respective Elemental Processor data bus lines. The Segregator Functional Plane also includes a second set of commonly activatable switches for electrically severing each of the Address Bus, Control Bus, Clock, Address Valid, and Configuration Latch Reset lines. Further, a third set of commonly activatable switches are included within the Segregator Functional Plane for electrically severing the input and output data lines that interconnect the control and Array Processors.

Thus, an advantage of the present invention is that it permits the Array Processor to be dynamically reconfigurable. Since the activation of the switch sets is controlled by the Control Processor, any combination of the switch sets may be selectively activated or deactivated during the operation of the Array Processor.

Another advantage of the present invention is that it may be used to effectively increase the number of paralleled Elemental Processors. By activating only the pseudo-module switch set, concurrent operation of corresponding functional planes within each of the segregated subsets can be provided. This is particularly useful in data processing applications where large data sets are to be processed.

A further advantage of the present invention is that it may be used to effectively create a number of independent Array Processors. By activating all of the switch sets and by further providing a Control Processor for each of the segregated subsets of the Array Processor, independent operation of each of the subsets as a functionally separate Modular Array Processor is provided. This is of particular use in data processing application where pipeline data processing is required.

Still another advantage of the present invention is that it can substantially reduce the power consumption of the Array Processor while increasing its speed and reliability. By fully segregating a number of contiguous subsets of inactive, or unused, functional planes, the effective length of all of the data and control lines is reduced, thereby reducing the dynamic loading of the line driving circuits.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures and wherein:

FIGS. 5b and c are circuit details of open collector and open drain buffer circuits, respectively, that may be used in conjunction with the circuit shown in FIG. 5a.

DETAILED DESCRIPTION OF THE INVENTION

I. Overview of the Modular Array Processor Architecture

As previously explained, a general Cellular Array Processor (CAP) system is comprised of two principal components: one, an Array Processor and, two, a Control Processor that is used to direct the operation of the Array Processor. The present invention provides for an Array Processor having a modular, and therefore highly flexible, architectural design that is particularly well suited for use in CAP systems. It should be understood, however, that the present invention is related to the modular architecture disclosed. It is conceptually distinct from any particular physical embodiment, even though it may be best described in physical terms. However, the intended mode of physically embodying the present invention is disclosed in "Three-Dimensionally Structured Microelectronic Device", U.S. Pat. No. 4,275,410 issued to Jan Grinberg et al. on June 23, 1981, and "Parallel Interconnect for Planar Arrays", U.S. Pat. No. 4,239,312 issued to Jon H. Myer et al. on Dec. 16, 1980, both of which are assigned to the assignee of the present invention.

Figure 1:
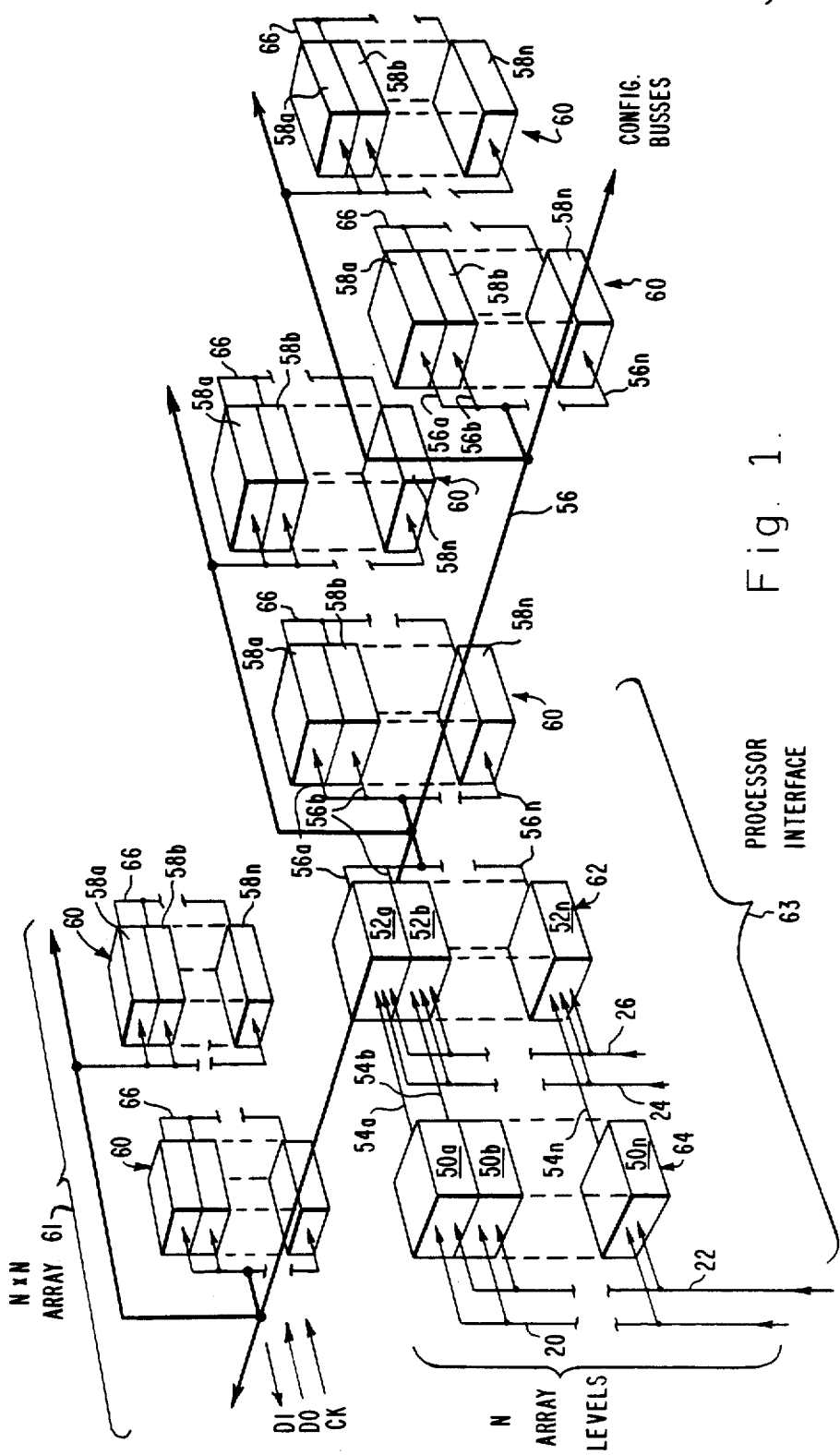
FIG. 1 is a schematic block diagram of a Modular Array Processor.

Accordingly, the Array Processor 61 and Processor Interface 63 of the preferred architectural embodiment of the present invention are shown in FIG. 1. The Array Processor 61 is comprised of a plurality of Elemental Processors 60 that are distributed as cells within a regular NxN array, thereby topologically matching the distribution of pixels within an image or, equally, the data points present within any two dimensionally structured data set. This is in keeping with conventional CAP system designs.

The Elemental Processors 60 are essentially identical, each being composed of a plurality of Modules 58 operatively interconnected by a Data Exchange Subsystem utilizing a common Data Bus 66. Architecturally, the Elemental Processors 60, in forming the Array Processor 61, occupy a three dimensional space, wherein the Modules 58 are distributed on a plurality of array levels that are parallel to, and overlie, one another. The Elemental Processors 60 extend in parallel across these array levels so that each contains a module in the corresponding NxN module arrays present on each of the different array levels.

The Modules 58 are, based on their design, generally similar to one another. They are essentially independent units within their respective Elemental Processors 60 and are generically comprised of an input-programmable logic circuit and a closely associated memory register. The logic circuit utilizes bit-serial circuitry to perform a number of related logical and data-manipulative operations on data received from the Data Exchange Subsystem in conjunction with the data present in its corresponding memory register. The logic circuit is specifically programmed, or configured, to perform a particular logical operation by establishing the appropriate combination of logic signals at its inputs. That is, the particular logic state of each of the programmable inputs determines whether corresponding sections or subfunctions of the logic circuit are enabled or disabled, thereby configuring the logic circuit for a particular logical operation.

The Modules 58, however, are of a number of functionally distinct types, each having an input-programmable logic circuit of a different, though basically similar, design. The different functional types of modules may include those that function as memories, accumulators, counters, and comparators. Design examples of these are shown in FIGS. 6, 9, 11, and 12, and will be discussed in greater detail below. It should be understood that practically any basic data manipulation function can be implemented as a Module 58 within an Elemental Processor 60 so long as the design of its logic circuit is consistent with those of the design examples. That is, the input-programmable logic circuit must: (1) be of a standard logic design, such as bit-serial arithmetic, (2) provide all of the logical and data manipulation operations that are required by and consistent with its general functional type, including data storage and transfer, and (3) include a data transfer circuit, typically consisting of a data transmitter and receiver, so that the Modules 58 share a common means of data exchange. Thus, the functional types of modules are not limited to those mentioned above.

The Elemental Processors 60 are thus formed from a plurality of Modules 58 that are operatively interconnected by their respective Data Exchange Subsystems 74. Each plurality of Modules 58 may include any number of each functional type. However, in keeping with general CAP system designs which require each Elemental Processor, or cell, to be functionally identical, each of the composite Elemental Processors 60 must contain like numbers of each functional type of Module 58. Further, in order for the Array Processor 61 to operate as a SIMD machine, again in keeping with general CAP system designs, the Modules 58 architecturally present on each array level should be of the same functional type. Thus, each module array forms a functional plane, such as a memory plane or an accumulator plane, that lies transverse to the Elemental Processors 60 within the Array Processor 61. In addition, the Modules 58 that form a given functional plane must be operatively connected in common for control purposes so as to always simultaneously execute a common logical function, thereby inherently establishing the SIMD operation of the Array Processor 61.

Figure 5A:
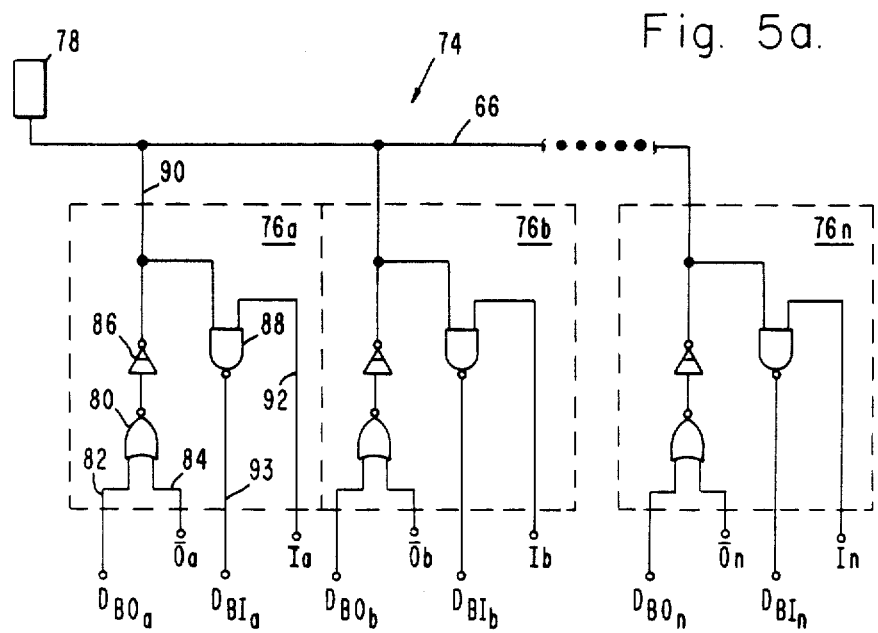
FIG. 5a is a schematic circuit diagram of the Data Exchange Subsystem which includes a data bus and its associated interface logic for commonly interconnecting a number of modules so as to form an Elemental Processor such as that shown in FIG. 4.

As previously mentioned, the Modules 58 present in a composite Elemental Processor 60 are principally interconnected for the purpose of intermodule transfer of data by a Data Exchange Subsystem, such as the one shown in FIG. 5a. This subsystem is comprised of a Data Bus 66 and a plurality of essentially identical Data Bus Interface Circuits 76 a-n, each being present in a respective Module 58 of the composite elemental processor 60. The Bus Interfaces 76 are, in fact, integral sections of their corresponding input-programmable logic circuits.

The Data Bus 66 is a common interconnection between all of the Bus Interfaces 76 that are present in the Modules 58 of a composite Elemental Processor 60. This commonality allows any number of Modules 58 to be incorporated into an Elemental Processor 60, with each effectively being architecturally (and electrically) equidistant from the other. Thus, the Elemental Processors 60 may be optimally configured for either a particular or a general application by the incorporation of an appropriate number of each functional type of Module 58 therein.

The Data Exchange Subsystem 74 allows for the transfer of serial data between any number of Modules 58 within the composite Elemental Processor 60. To provide serial data on the common Data Bus 66, at least one Bus Interface 76 must be configured to transmit data as it is serially shifted from its respective memory register onto the Data Bus 66. Considering the case where two or more Modules 58 are configured to serially transmit their respective and typically different data, the subsystem effectively functions to logically AND the data together. It thereby resolves any bit-conflict in the respective serial data by forcing the transmission of a logical 0 onto the Data Bus 66 at that time. In order for data to be received by one or more Modules 58, their respective Bus Interfaces 76 must be configured to transfer serial data from the data bus to their respective input-programmable logic circuits. The data may then be serially shifted into its respective memory register or operated on by the input-programmable logic circuit with the product therefrom then being shifted into the memory register. Thus, in the case of two or more Modules 58 receiving data simultaneously, the data is either simply copied into a number of memory registers or logically operated on consistent with any of the module function types present in the composite Elemental Processor 60, or both. Finally, the Modules 58 not configured for either transmitting or receiving data must be effectively, or functionally, disconnected from the Data Bus 66. This is accomplished by configuring their Bus Interfaces 76 to continuously transmit a logical 1 onto the bus 66. This allows the subsystem, by virtue of its data conflict resolving ability, to effectively ignore those Modules 58 not actively transmitting or receiving data. Thus, inactive Modules 58 are electrically, but not functionally connected to their respective Data Busses 66.

Figure 2:
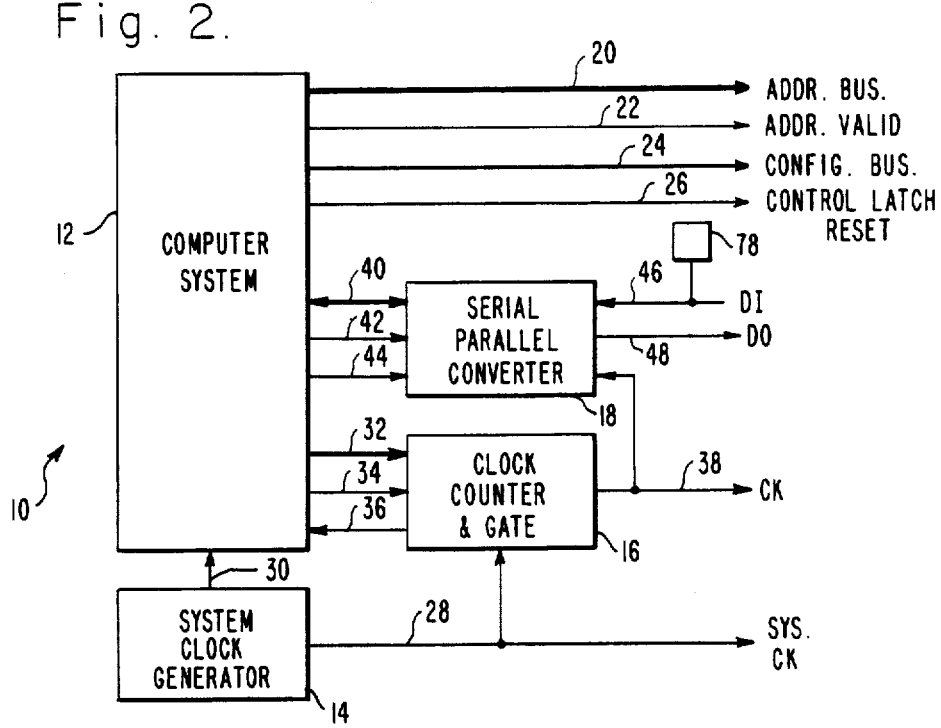
FIG. 2 is a schematic block diagram of a Control Processor suitable for directing the operation of the Array Processor.

The Control Processor 10, shown in FIG. 2, is operatively connected to the Modules 58 of the Array Processor 61 by the Processor Interface 63, shown in FIG. 1. The Processor Interface 63 is comprised of a plurality of individual interface circuits 49, such as the one shown in FIG. 3. An Interface Circuit 49 is architecturally present on each array level and consists of an Address Decoder 50 and a Configuration Latch 52, the inputs of each being connected to the Control Processor 10 by an Address Bus 20 and a Control Bus 24, respectively. The outputs of the Configuration Latch 52 are, in turn, connected to the programmable inputs of the input-programmable logic circuits contained in the Modules 58 of its corresponding functional plane, i.e. present on its respective array level. More specifically, the corresponding programmable inputs of the logic circuits are respectively connected together, each then being connected to a separate output of the Configuration Latch 52 by means of the configuration Bus 56. Thus, the Control Processor 10 can selectively address and write a preselected control word into each of the Configuration Latches 52. Since each bit of a control word establishes the logic state of a common input of its corresponding input-programmable logic circuits, the control word effectively defines the functional configuration of all of the Modules 58 present in its respective functional plane. Consequently, the Control Processor 10 is provided with a simple means of separately configuring each functional plane within the Array Processor 61.

The general operation of the Array Processor 61, as previously mentioned, is directed by the Control Processor 10, shown in FIG. 2. The Control Processor 10 includes a Computer System 12 of conventional design and is capable of providing for program storage and sequencing, data storage and I/O data buffering, and random access to the interface circuits 49 of the Array Processor Interface 63.

Figure 13:
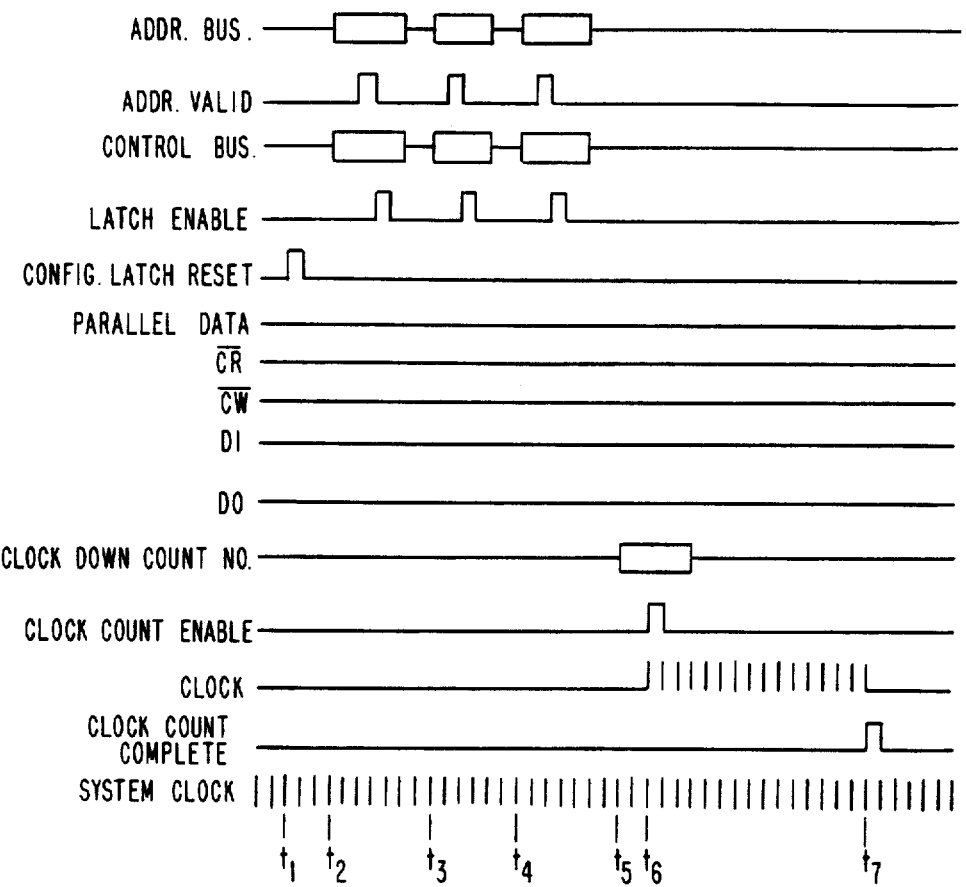
FIG. 13 is a schematic timing diagram for explaining the data level shift operation of the Array Processor according to the present invention.

The programs executed by the Control Processor 10 are naturally based on image processing algorithms. These algorithms are generally well-known in the art and can be used in conjunction with the Array Processor 61 to perform such tasks as signal analysis, involving Fourier transforms and matrix multiplication, and image analysis, involving contrast enhancement, edge definition, and object location. Each algorithm establishes a particular series of logical functions that must be performed on the image data set in order to extract the desired information. These logical functions can be conveniently performed by the Array Processor 61 by basically directing it to transfer a data set that has previously been mapped into the memory registers of one functional plane to those of another functional plane of the desired functional type. A succession of these data set transfers, or level shifts, even with a minimum of different functional types of Modules 58, can be used to implement practically any image processing algorithm. The particular steps necessary to perform a level shift are shown in FIG. 13 and will be discussed in greater detail below.

II. Detailed Description of the Modular Array Processor

A. The Control Processor

A Control Processor System 10, such as the one shown in FIG. 2, is required to direct the operation of the Array Processor 61. It necessarily includes a digital computer system 12 of conventional design, such as a high speed, bit-slice system as typified by an Advanced Micro Devices AMD2901 microprocessor based system. It should be understood, however, that the present invention is not directed to the design of the Control Processor 10, but rather at a complete array processor system that includes a Control Processor. Thus, the Control Processor's necessary capabilities, and general means for providing them, are described below only for purposes of completeness.

The Control Processor 10 must be capable of supplying all of the signals necessary to interface with the Array Processor Interface 63 for purposes of controlling the Array Processor 61. Accordingly, the Control Processor 10 must be capable of providing an array level select address on the Address Bus 20 for randomly accessing the interface circuits 49 of the Processor Interface 63. The number of parallel lines in the Address Bus 20 is preferably ten, or at least the logarithm to the base 2 of the number of array levels that may be randomly selected. The Control Processor must be capable of providing a control word of 16 bits in length on the Control Bus 24, there being preferably 16 parallel lines therein. In conjunction with the address and control word, the Control Processor 10 must provide an Address Valid signal on the Address Valid line 22 for indicating that the address and its corresponding control word are stable on their respective busses. Finally, it must be capable of providing a Configuration Latch Reset signal on the Reset line 26 for resetting the bits of all of the configuration latches present in the Processor Interface 63 to their inactive states.

The Control Processor 10 must also be capable of providing a stable, high speed (preferably around 10 MHz) System Clock Signal (SYS CK). A standard clock generator 14 can be used to provide the necessary SYS CK signal on the System Clock line 28. It may also provide a signal on line 30 to ultimately synchronize the computer system 12 with the Array Processor 61.

The Control Processor 10 must further be capable of gating a preselected number of clock pulses derived from SYS CK onto the Array Processor Clock (CK) line 38. This may be accomplished through the use of a clock counter and gate 16 that includes a standard down counter circuit and an AND gate. A CK pulse count number is provided to the input latch of the clock counter and gate 16 by means of a unidirectional data bus 32. The operation of the clock counter and gate 16 is initiated by a Down-Count Enable signal on control line 34. In response, the Clock Counter and Gate 16 enables the transfer of SYS CK pulses onto the CK line 38 by means of the AND gate while counting down the preselected number of SYS CK pulses. At the completion of the down count, the clock counter and gate 16 disables the transfer of SYS CK pulses and provides the computer system 12 with a Down-Count Complete Signal on control line 36.

Finally, the Control Processor system 10 must also provide for the serial exchange of data (data I/O) with the Array Processor 61 on the Data In/Data Out lines 46, 48. This may be accomplished with the use of a standard serial-to-parallel and parallel-to Serial Converter 18. Single data words from a two-dimensionally structured data set that has been temporarily stored in, or buffered by, the Computer System 12 may be transferred in parallel to the Converter 18 by means of the bidirectional Data Bus 40. There, each parallel data word, having a preferred word length of 16 bits, is serially transferred to the Array Processor 61 via the Data Out (DO) line 48. Conversely, a serial data word from a data set stored in the Array Processor 61 can be transferred to the Converter 18 via the Data In (DI) line 46. The data word is then converted to parallel and transferred to the Computer System 12 over the Data Bus 40.

Figure 3:
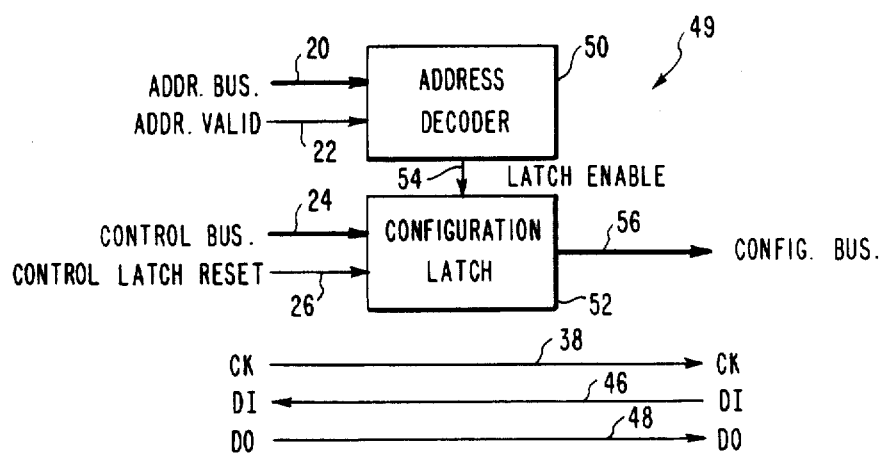
FIG. 3 is a schematic block diagram detail of the Control Processor/Array Processor interface.
Figure 4:
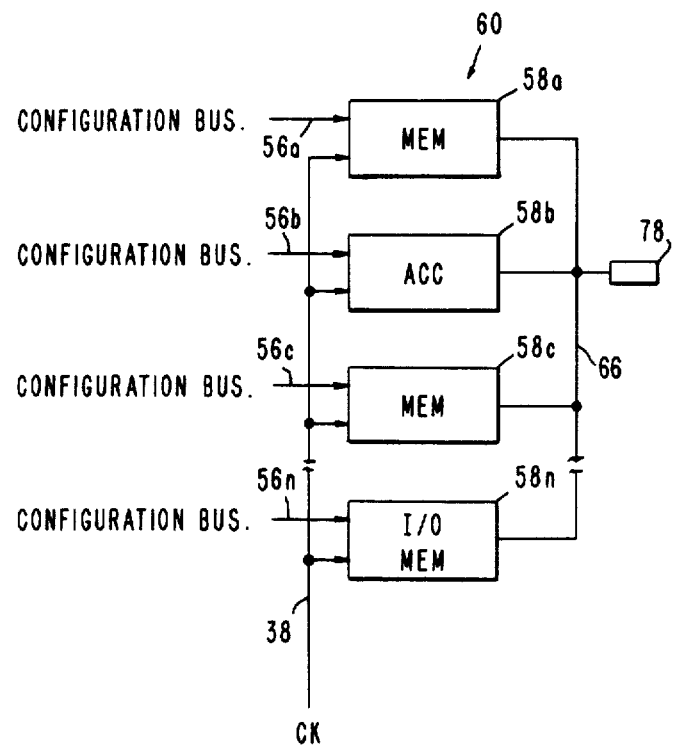
FIG. 4 is a schematic block diagram detail of an Elemental Processor used in the Array Processor of FIG. 1.

Control lines 42, 44 are provided by the Computer System 12 for respectively controlling the serial data in, parallel data word read operation and the parallel data word write, serial data out operation of the Converter 18. The serial/parallel conversion of data by the Converter 18 is in response to, and synchronous with, the CK pulses as provided by the Clock Counter and Gate 16 to the Converter 18 on the Clock Signal line 38. The CK pulses are also, simultaneously, provided to the Array Processor 61. Thus, the clock down-count number directly determines the word length of the data to be exchanged between the Control Processor 10 and the Array Processor 61. As shown in FIG. 3, the CK, DI and DO lines 38, 46, 48 are passed through each of the Interface Circuits 49 and made available to the functional planes on their corresponding array levels.

B. Array Processor

As previously explained, the Array Processor 61 is comprised of a plurality of Elemental Processors 60 which are, in turn, comprised of a plurality of Modules 58 of several different functional types. The Modules 58 are associated so that, conceptually, the Elemental Processors 60 are parallel, thereby providing for a parallel flow of data within the Array Processor 61. Since the Modules 58 of each Elemental Processor 60 are interconnected only by the single Data Bus 66 of their respective Data Exchange Subsystems, the data flow therein is accurately described as bit-serial. However, it can also be described as word-parallel, due to the common and simultaneous operation of the parallel Elemental Processors 60. This word-parallel, bit-serial operation allows the Array Processor 61 to effectively process an entire image at one time. Further, this type of operation allows the use of fairly simple serial arithmetic circuitry in the implementation of the logic circuits of the various functional types of modules.

In order to provide the common word-parallel, bit-serial mode of operation, the Modules 58 are further associated as functional planes transverse to the Elemental Processors 60, each plane being composed of a common funtional type of Module 58 present on an array level of the Array Processor 61. The several types of Modules 58 thereby provide for such functional planes as memory, accumulator, counter, and comparator.

C. Processor Interface

The Control Processor 10 is operatively associated with each of the functional planes by a respective one of the interface circuits 49 which, together, comprise the Processor Interface 63, shown in FIG. 1. Referring now to FIG. 3, each Interface Circuit 49 consists of a single, preferably 16 bit wide, word parallel data latch 52 and an associated Address Decoder 50. The Address and Address Valid inputs of the Address Decoder 50 and the Data and Latch Reset inputs of the Configuration Latch 52, along with the corresponding inputs of all of the interface circuits 49 of the Processor Interface 63, are respectively connected to the parallel lines of the Address Bus 20, the Address Valid line 22, the Control Bus 24 and the Configuration Latch Reset line 26. Each Address Decoder 50 is also operatively connected to its respective Configuration Latch 52 by a latch enable line 54. The data outputs of the Configuration Latches 52 as thereby provided from a plurality of configuration buses 56 that are each operatively associated with a separate functional plane of the Array Processor 61.

Considering now the operation of the Processor Interface 63, each Address Decoder 50 present therein is responsive to a particular array level select address that is provided by the Control Processor 10 on the Address Bus 20. Thus, the operation of a particular Interface Circuit 49 is initiated when the Address Decoder 50 detects its corresponding address on the Address Bus 20 in the presence of the Address Valid signal on the Address Valid line 22. The Address Decoder 50, at that point, generates a latch enable signal on the latch enable line 54. In response, the Configuration Latch 52 latches in the control word as provided by the Control Processor 10 in conjunction with the array level select address and, therefore, currently present on the Control Bus 24. Once latched, the respective bits of the control word directly establish the logic states of the signals present on the separate parallel lines of the Configuration Bus 56. The control word, as present in the Latch 52, remains stable until either a new control word is addressed to the Latch 52 or a Configuration Latch Reset Control Processor 10 on the CK line 38, to the Memory Register 118. Each clock pulse applied causes the data contained in the Memory Register 118 to be shifted right by one bit, thereby providing for the serial

TABLE I

| Bit | Mnemonic | Name | Active State | Function |
|---|---|---|---|---|
| | | Configuration Bus Inputs for Memory Functional Plane | | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is being transferred from the memory register to the Data Exchange Subsystem. |
| 4 | CLK | Clock Enable | High | Enables application of CK pulses to the shift register. |
| 5 | MSB | Most Significant Bit | High | Selects the transfer of the most significant bit of data in the memory register to the Data Exchange Subsystem. |
| | | | Low | Selects the serial transfer of data through the Least Significant Bit position of the memory register to the Data Exchange Subsystem. |
| 6 | REC | Recirculate | High | Enables the recirculation of data from the LSB to the MSB position of the memory register during shifting. |
| 7 | NI | North Data In Enable | High | Enables the reception of data from the south nearest neighboring Memory Module. |
| 8 | EI | East Data In Enable | High | Enables the reception of data from the west nearest neighboring Memory Module. |
| 9 | SI | South Data In Enable | High | Enables the reception of data from the north nearest neighboring Memory Module. |
| 10 | WI | West Data In Enable | High | Enables the reception of data from the east nearest neighboring Memory Module. |
| | | Additional Inputs and Outputs | | |
| | CK | Clock | Pulse | Shifts the data in the memory register one position to the right; edge sensitive, low when inactive. | signal is received on the Reset line 26.

D. Memory Functional Plane

Figure 6:
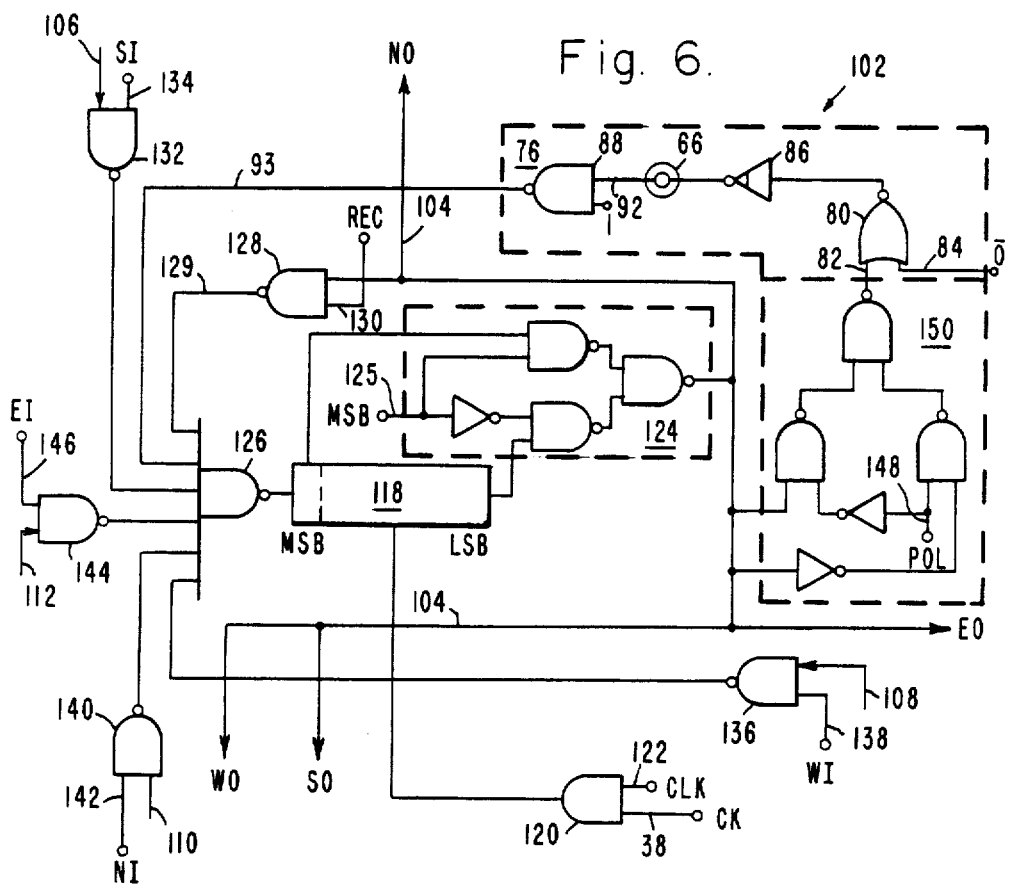
FIG. 6 is a schematic block and circuit diagram of the memory register and Input Programmable Logic Circuit of the memory functional type of module.

The functional type of a particular Module 58, as well as its corresponding functional plane, is determined by the particular design of its input-programmable logic circuit. A memory type input-programmable logic circuit is shown in FIG. 6. The various programmable inputs are listed along with their functional definition in Table I.

The Memory Module is designed to have two major functions. The first is to provide for the storage of a single data word from a two-dimensionally structured data set. This allows an entire image to be mapped directly into a Memory Functional Plane, thereby inherently preserving the spatial interrelationship of its constituent data words. The second function is to provide for the lateral transfer of its data word to the corresponding Memory Module of an adjacent Elemental Processor, i.e., to one of the four nearest neighboring modules within its functional plane. This function, when considered in terms of the entire Memory Functional Plane, permits an entire image to be laterally shifted in any one of the four orthogonal directions within the plane without loss of the image's spatial integrity. Accordingly, a Memory Logic Circuit capable of providing these functions is now described.

Figure 5B:
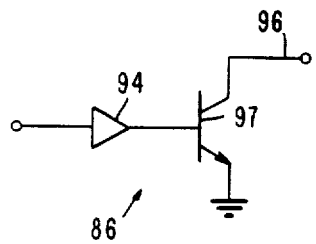
Figure 5C:
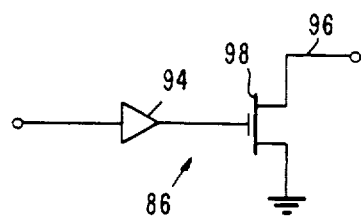

The central component of the Memory Logic Circuit 102, as shown in FIG. 6, is naturally a Memory Register 118, preferably having a length of 16 bits. The Clock Enable signal, when applied to the CLK programmable input of the AND gate 120, enables the application of a preselected number of clock pulses, as provided by the transfer of data both to and from the Memory Register 118. Thus, when CK pulses are applied, serial data from the Most Significant Bit (MSB) or Least Significant Bit (LSB) of the Memory Register 118, depending on the logic state of the MSB programmable input 125, is transferred through the Data Selector Circuit 124 to the nearest neighbor output line 104. The serial data is thereby made available to each of the four nearest neighboring Memory Modules within its respective functional plane. The data on the nearest neighbor output line 104 is also provided to the Polarity Selection Circuit 150 wherein the polarity of the data is either inverted or noninverted according to the logic state of the POL programmable input 148. The data therefrom is then provided to the data transmitter section of the memory module's Data Bus Interface Circuit 76 via the data line 82. There, the data is combined with the Output Enable signal on the $\overline{O}$ programmable input line 84 by the NOR gate 80. This results in either the data or a logical 1 being buffered by the open collector output buffer 86 onto the data bus line 66 and thereby made available to the other Modules 58 of its respective Elemental Processor 60. It should be understood that either a standard open collector, grounded emitter bipolar output buffer, such as shown in FIG. 5b, or an open drain, grounded source FET output buffer such as shown in FIG. 5c, may be used, depending on the family of logic used, to implement the module logic circuits.

Data is also serially input into the Memory Register 118 through its MSB position when CK pulses are applied. This input data is provided by the multiple input NAND gate 126 as the product of data from a number of different sources. One such source is the data receiver section of the Data Bus Interface Circuit 76. There, a logical NAND gate 88 is used to combine the data Input Enable signal present on the I programmable input line 92 with the data present on the Data Bus 66. Either the serial data received or a logical 1 is thereby provided to the NAND gate 126 via its input line 93, depending on the logic state of the data Input Enable signal.

Another source of data is the Memory Register 118 itself. Data output from the register onto the Nearest Neighbor Data Output line 104 is combined with the Recirculation Enable signal as applied to the REC programmable input 130 of the NAND gate 128, thereby providing either the inverted data recirculated from the output of the Memory Register 118 or a logical 1 to the NAND gate 126 via its input line 129.

The remaining sources of data are the four nearest neighboring Memory Modules. In each case, the data present on the Nearest Neighbor Data Output lines 106, 108, 110, 112 are combined with their corresponding directional Input Enable signals on the SI, WI, NI, EI programmable inputs, 134, 138, 142, 146 of the logical NAND gates 132, 136, 140, 144, respectively. Either the inverted data from a nearest neighboring module or a logical 1 is thereby provided by each as an input to the NAND gate 126.

Figure 7:
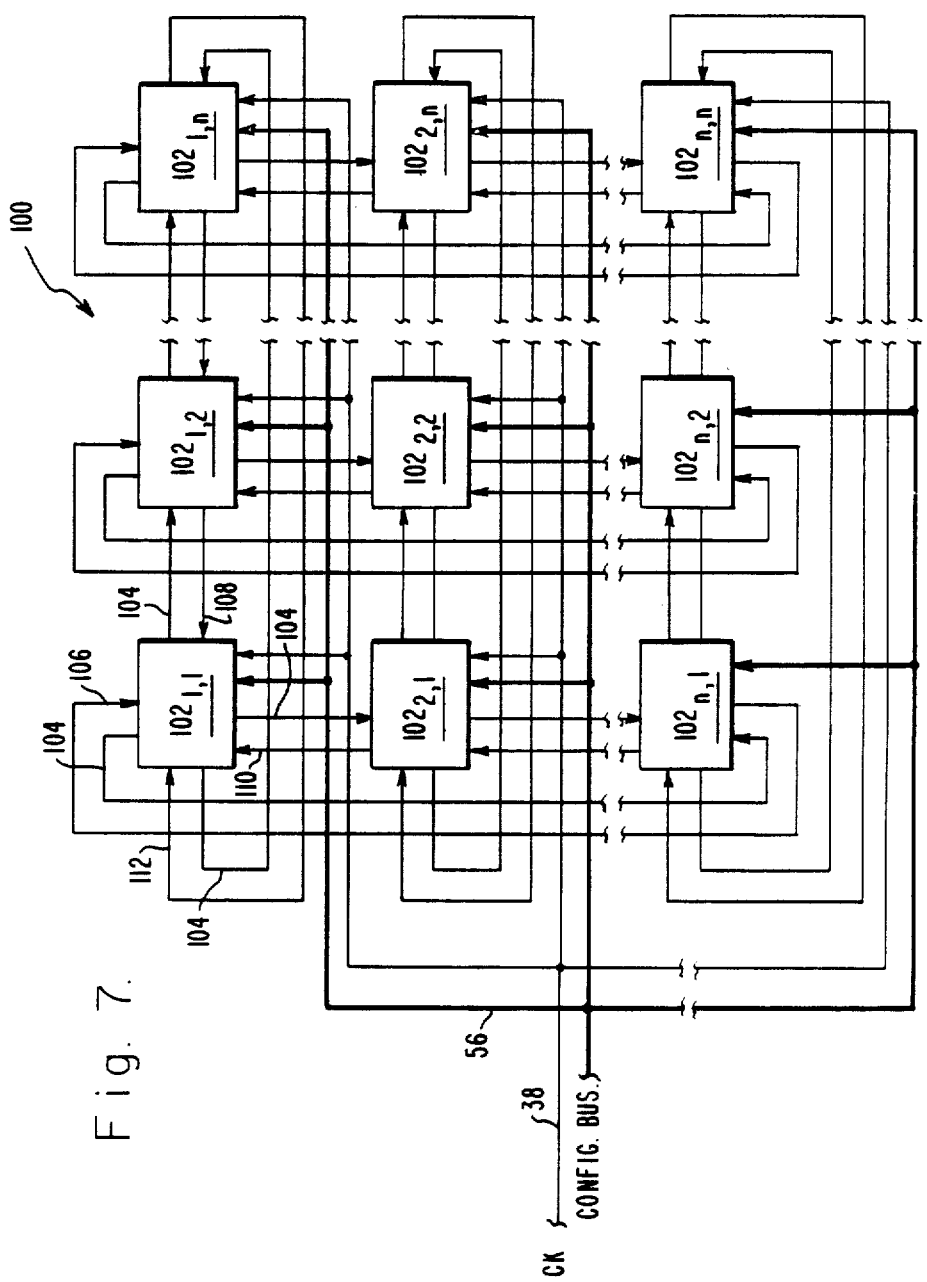
FIG. 7 is a schematic block diagram of a Memory Functional Plane consisting of an array level of memory function modules.

A Memory Functional Plane 100, conceptually taken as a cross-section of the Array Processor 61 transverse to its Elemental Processors 60 is shown in FIG. 7. The Modules 58 containing the memory input-programmable logic circuits 102 are shown distributed as an NxN array. The logic circuits 102 of the Memory Functional Plane 100 are interconnected, for purposes of bidirectional serial data transfer, to each of their four nearest neighbors. Considering the corner module $102_{1,1}$ of the functional plane 100, it provides data to its neighboring modules, $102_{1,2}$, $102_{1,n}$, and $102_{n,1}$, by means of the Nearest Neighbor Data Output line 104. The corner module $102_{1,1}$ also receives data from each of its nearest neighboring modules by means of their respective Nearest Neighbor Data Output lines 108, 112, 110, 106. Thus, as can be seen, the nearest neighbor interconnections wrap around the module array of the Memory Functional Plane 100 so that no data is lost at any edge boundary of the NxN array.

For purposes of control, the modules 102 are commonly connected to the configuration Bus 56 of the Interface Circuit 49 corresponding to the Memory Functional Plane 100. The programmable inputs of each of the module input-programmable logic circuits 102 are connected so that each of the parallel lines of the Bus 56 is commonly connected to all of the programmable inputs of a given type. Thus, all of the module input-programmable logic circuits 102 present in the Memory Functional Plane 100 are always operatively configured identical to one another, since the logic states of their programmable inputs are commonly established by the control word present in the data latch 52 of its corresponding processor Interface Circuit 49.

Finally, the clock pulses generated by the Clock Counter and Gate 16 of the Control Processor 10 are commonly provided to the input-programmable logic circuits by means of the clock line 38.

E. I/O Functional Plane

Figure 8:
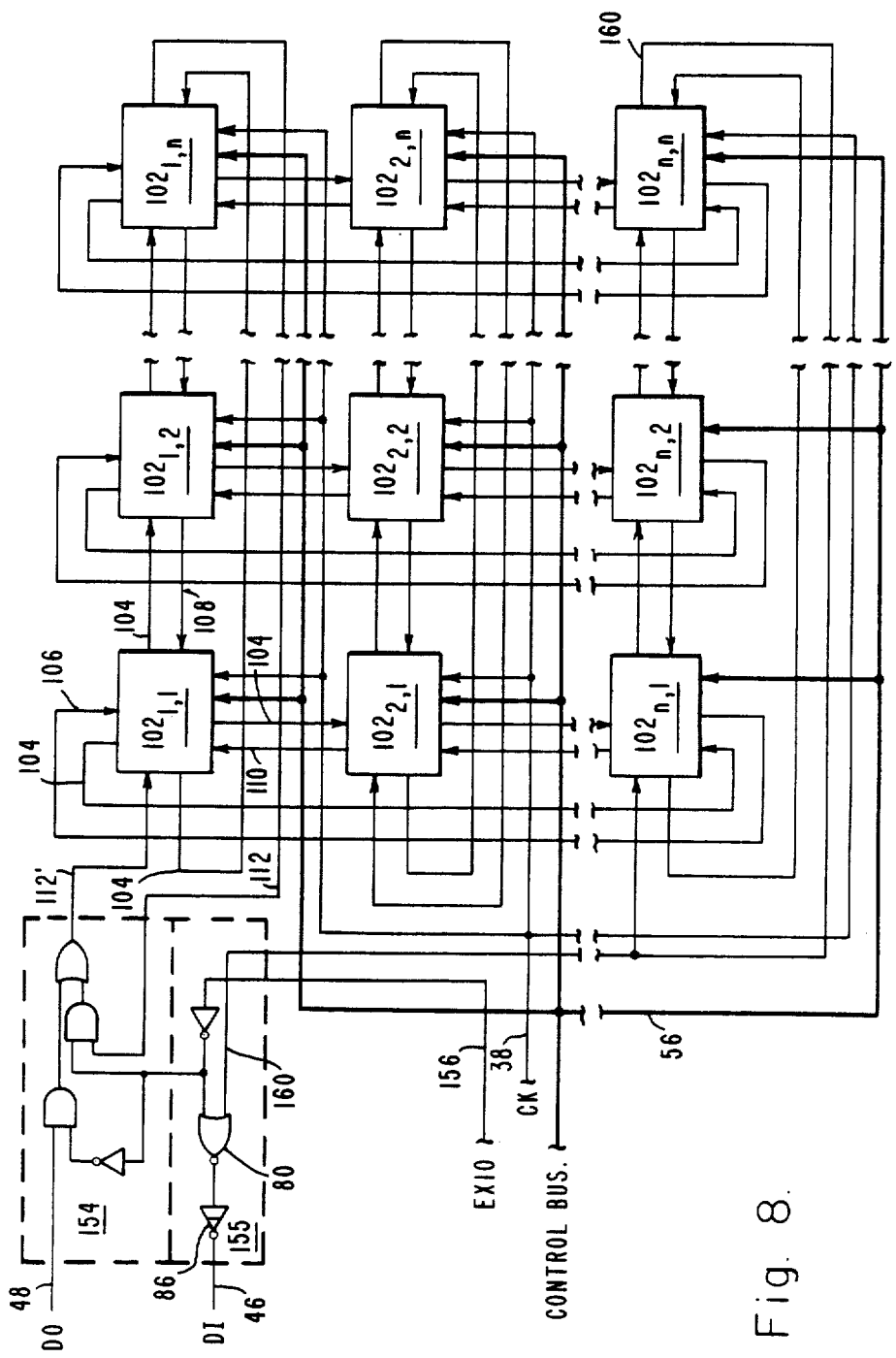
FIG. 8 is a schematic block and circuit diagram of the Memory Functional Plane, as shown in FIG. 7, modified to permit serial input/output data exchange with the Control Processor system.

The I/O function plane 152, as shown in FIG. 8, is essentially a Memory Functional Plane that has been modified to permit the serial exchange of data with the Control Processor 10. Table II provides a listing and functional description of the various inputs and outputs required by the I/O Functional Plane.

TABLE II

| Bit | Mnemonic | Name | Active State | Function |
|---|---|---|---|---|
| | | | Configuration Bus Inputs for I/O Functional Plane | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is being transferred from the memory register to the Data Exchange Subsystem. |
| 4 | CLK | Clock Enable | High | Enables application of CK pulses to the shift register. |
| 5 | MSB | Most Significant Bit | High | Selects the transfer of the most significant bit of data in the memory register to the Data Exchange Subsystem. |
| | | | Low | Selects the serial transfer of data through the Least Significant Bit position of the memory register to the Data Exchange Subsystem. |
| 6 | REC | Recirculate | High | Enables the recirculation of data from the LSB to the MSHB position of the memory register during shifting. |
| 7 | NI | North Data In Enable | High | Enables the reception of data from the south nearest neighboring Memory Module. |
| 8 | EI | East Data In Enable | High | Enables the reception of data from the west nearest neighboring Memory Module. |
| 9 | SI | South Data In Enable | High | Enables the reception of data from the north nearest neighboring Memory Module. |
| 10 | WI | West Data In Enable | High | Enables the reception of data from the east nearest neighboring Memory Module. |
| 11 | EXIO | External I/O Enable | High | Enables the bidirectional serial transfer of data between the Memory Module array and the Control Processor across the DI/DO bus lines. |
| | | | Additional Inputs and Outputs | |
| | CK | Clock | Pulse | Shifts the data in the memory register one position to the right; |

TABLE II-continued

| Bit | Mnemonic | Name | Active State | Function |
|---|---|---|---|---|
| | DI | Data In | N/A | edge sensitive, low when inactive. Unidirectional serial data bus for transfering data from the Array Processor to the Control Processor. |
| | DO | Data Out | N/A | Unidirectional serial data bus for the transfer of data from the Control Processor to the Array Processor. |

The I/O Functional Plane 152 is substantially identical to the Memory Functional Plane 100. They differ, however, in that the I/O Functional Plane 152 includes a serial Data Receiver/Selector 154 for selecting between data provided by the Control Processor 10 on the DO line 48 and the data provided by the neighboring Memory Module $102_{1,n}$ on its Nearest Neighbor Data Out line 112. The data from either source is provided to the Memory Logic Circuit $102_{1,1}$ on its East Data in line 112'. The selection between these two sources of data depends on the External I/O signal present on the EXIO programmable input 156. The I/O Functional Plane 152 also includes the serial Data Transmitter Circuit 155. This circuit is functionally identical to the data transmitting portion of the Bus Interface Circuit 76. The Nearest Neighbor Data Out line 160 of the Memory Logic Circuit $102_{n,n}$ provides data to the Data Transmitter Circuit 155. This data is combined with the External I/O signal on the EXIO programmable input line 156 by a NOR gate 80 and buffered onto the DI line 46 by the Open Collector Buffer Circuit 86. Similar to the operation of the Data Bus Interface Circuits 76, either the data present on the Nearest Neighbor Data Out line 160 or a logical 1 is transmitted, the selection depending on the logic state of the EXIO signal. Thus, when the EXIO signal on its programmable input 156 is a logical 0, the Data Receiver/Selector circuit 154 provides the top row, corner Memory Logic Circuit $102_{1,1}$ with data from the Nearest Neighbor Data Out line 112 while the Data Transmitter Circuit 155 transmits a logical 1 onto the DI line 46. In this configuration, the I/O Functional Plane 152 is operatively identical to the Memory Functional Plane 100. In the converse configuration, when the EXIO signal is a logical 1, the data receiver/selector 154 provides the top row, corner Memory Logic Circuit $102_{1,1}$ with data derived from the Control Processor 10 via the DO line 48, while the Data Transmitter Circuit 155 serially transmits data from the Nearest Neighbor Data Out line 160 of the bottom row, corner Memory Logic Circuit $102_{n,n}$ to the Control Processor 10 via the DI line 46.

F. Accumulator Functional Plane

Figure 9:
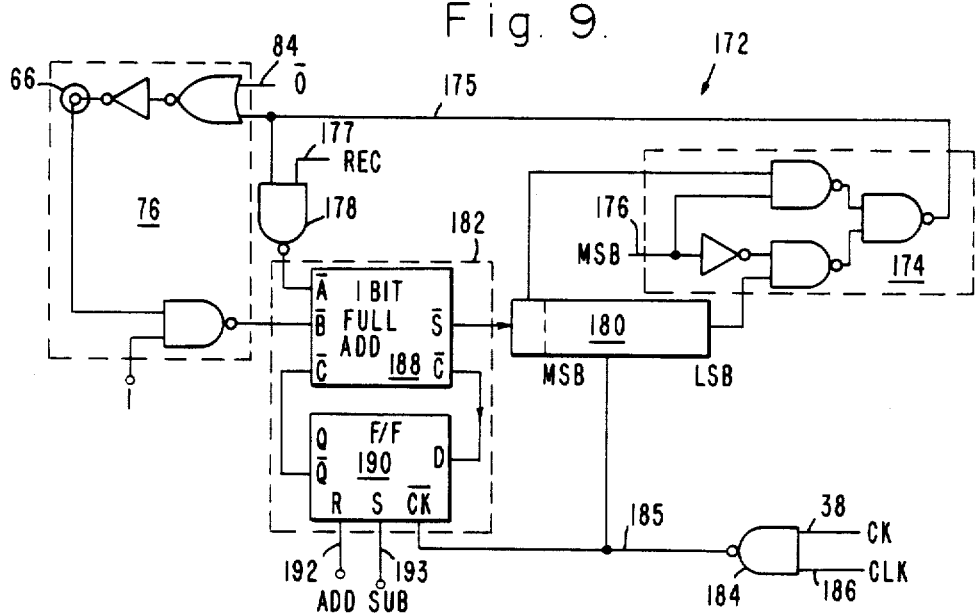
FIG. 9 is a schematic block and circuit diagram of an accumulator functional type of module.

The Modules 58 of an Accumulator Functional Plane each contain an accumulator type input-programmable logic circuit 172, as shown in FIG. 9. Table III provides a listing and functional description of each of the programmable inputs of the Accumulator Logic Circuit 172 and, equally, of an accumulator functional plane.

The accumulator module is designed to serially sum two data words and store the result. Thus, as shown in FIG. 9, the Accumulator Logic Circuit 172 substantially consists of a Memory Register 180, preferably 16 bits in length, and a 1-Bit Full Adder with Carry circuit 182. As in the Memory Logic Circuit 102, a NAND gate 184 is used to combine the clock pulses generated by the Clock Counter and Gate 16 as provided on the CK line 38 with the Clock Enable signal on the CLK programmable input 186, thereby allowing the selective application of the clock pulses to the Memory Register 180. Upon application of each clock pulse, the Memory Register 180 acts as a serial shift register, shifting the data contained therein 1 bit to the right. Data is output from the Memory Register 180 through the Data Selector Circuit 174 to the Data Bus Interface Circuit 76. The Data Selector Circuit 174 is of conventional design and selectively transfers output data from either the Most Significant Bit or Least Significant Bit of the Memory Register 180 to its data output line 175 depending on the logic state of the Most Significant Bit signal on the MSB proprammable input line 176. The transmission of data present on the data selector

TABLE III

| Bit | Mnemonic | Name | Active State | Function |
|---|---|---|---|---|
| Configuration Bus Inputs for Accumulator Functional Plane | | | | |
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | MSB | Most Significant Bit | High | Selects the transfer of the most significant bit of data in the memory register to the Data Exchange Subsystem. |
| | | | Low | Selects the transfer of the Least Significant Bit of data in the memory register to be transferred to the Data Exchange Subsystem. |
| 5 | REC | Recirculate | High | Enables the recirculation of the memory register data during shifting. |
| 6 | ADD | Add | High | Resets the 1 bit full adder with carry. |
| 7 | SUB | Subtract | High | Presets the 1 bit full adder with carry. |
| Additional Inputs and Outputs | | | | |
| | CK | Clock | Pulse | Shifts the data in the memory register one position to the right; edge sensitive, low when inactive. | output line 175 onto the Data Bus 66 is dependent on the output signal present on the Bus Interface Circuit's $\overline{O}$ programmable input 84. The data may also be recirculated through the recirculation NAND gate 178 and ultimately to the Memory Register 180 depending on the logic state of the Recirculate signal present on the REC programmable input 177. The 1-Bit Full Adder with Carry preferably consists of a 1-bit full adder 188 and an appropriately connected Flip-flop 190, acting as a 1-bit carry latch. The 1-Bit Full Adder with Carry 182 receives either, or both, data being recirculated to the Memory Register 180 and input data from the data bus line 66, as provided by the Bus Interface 76. The sum or difference of this data, depending on whether the ADD or SUB signal is present on their respective programmable inputs 192, 193 prior to the accumulation of data and whether the input data is true or inverted, respectively, is synchronously clocked out of the 1-Bit Full Adder with Carry 182 and into the Memory Register 180.

It should thus be apparent then that a two-step procedure is necessary to sum two data words. The first step is to serially sum a first data word into the Memory Register 180 from the Bus Interface 76. This is done with the recirculation of the data previously present in the Memory Register 180 disabled. Next, a second data word is serially input from the Bus Interface 76. At the same time, the first data word is recirculated from the Memory Register 180, both data words being synchronously applied to the 1-Bit Full Adder with Carry 182. The resulting serial sum is then shifted also synchronously, into the Memory Register 180. This sum is then available to be summed with additional data words or to be serially transferred to another Module 58 within its respective Elemental Processor 60.

Figure 10:
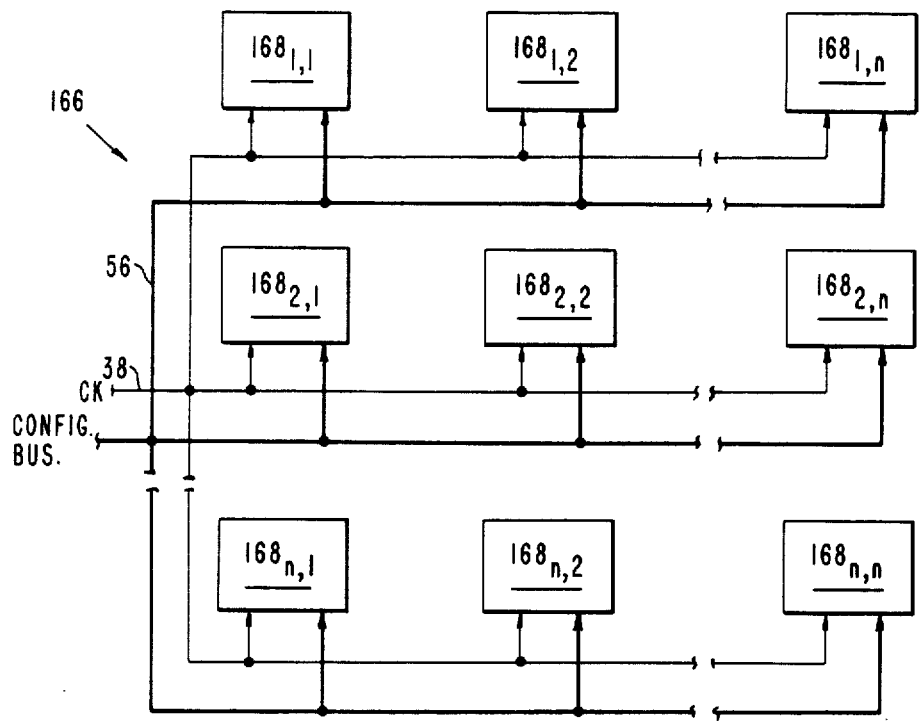
FIG. 10 is a schematic block diagram of an Accumulator Functional Plane consisting of an array level of Accumulator Modules.

An Accumulator Functional Plane 166 consisting of an N×N array of Accumulator Modules 168, each containing an accumulator input-programmable logic circuit 172, is shown in FIG. 10. As in the memory and I/O Functional Planes, the Accumulator Modules 168 are commonly connected to their corresponding processor Interface Circuit 49 by means of a configuration Bus 56. Thus, the corresponding programmable inputs of the Accumulator Logic Circuits 172 are commonly connected together and further connected to the respective parallel lines of the configuration Bus 56. This allows the control word, as selected and written into the configuration latch 56 by the Control Processor 10, to commonly establish the logic state of each of the programmable inputs of the accumulator circuits 172. Thus, there is a common configuration of the Accumulator Logic Circuits 172 in the Accumulator Functional Plane 166 as directly selected by the Control Processor 10. The preselected number of clock pulses, as generated by the Clock Counter and Gate 16 of the Control Processor 10, are commonly provided to each of the Accumulator Modules 168 and the logic circuits 172 contained therein by the clock line 38.

G. Counter Functional Plane

Figure 11:
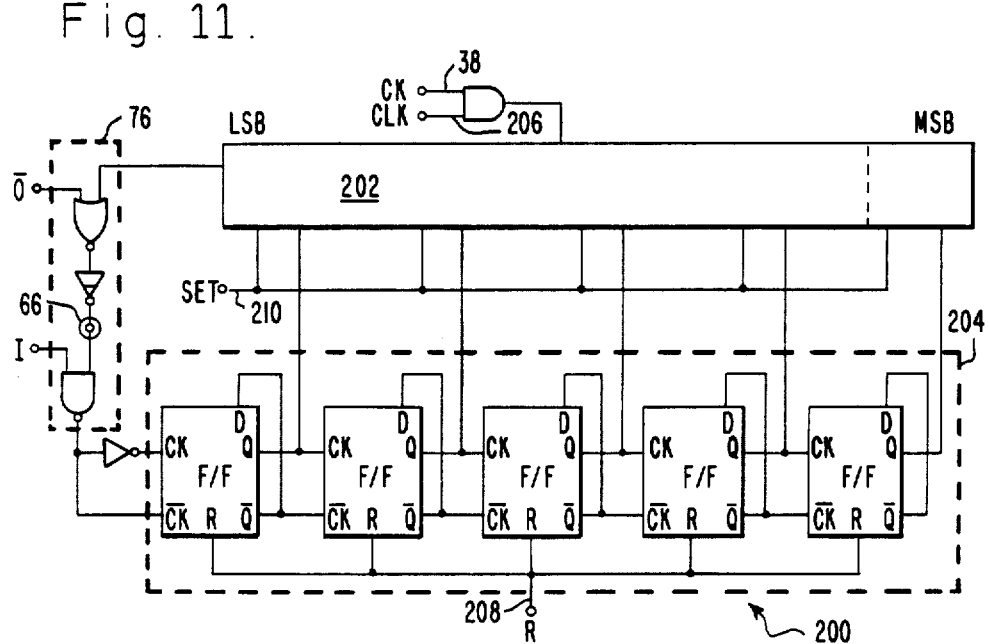
FIG. 11 is a schematic block and circuit diagram of the memory register and Input Programmable Logic Circuit of a counter functional type of module.

A counter input-programmable logic circuit is shown in FIG. 11. A listing and functional description of each of its programmable inputs and, therefore, of its corresponding Counter Functional Plane is provided in Table IV.

TABLE IV

| Bit | Mnemonic | Name | Active State | Function |
|---|---|---|---|---|
| Configuration Bus Inputs for Counter Functional Plane | | | | |
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | SET | Parallel Data Set | High | Enables the parallel transfer of the bit count total to the shift register. |
| 5 | R | Reset | High | Resets the bit counter. |
| Additional Inputs and Outputs | | | | |
| | CK | Clock | Pulse | Shifts the data in the memory register one position to the right; edge sensitive, low when inactive. |

The Counter Logic Circuit 200 is designed to develop the bit-sum of data present on the Data Bus 66. Accordingly, the Counter Logic Circuit 200 is essentially comprised of a standard five stage binary counter 204 and a corresponding five bit Memory Register 202. In operation, data is received by the first stage of the binary counter 204 from the Data Bus 66 via the Bus Interface Circuit 76. The receiver section of the Bus Interface Circuit 76 is enabled prior and disabled subsequent to the reception of each data bit from the Data Bus 66. Each logical 1 data bit received clocks the first stage of the binary counter 204 while the reception of a logical 0 has no effect on the binary counter. Thus, the binary counter 204 counts the number of logical 1 data bits sequentially present on the Data Bus 66, thereby functioning as a 1-bit full adder. This binary count, continuously available from the outputs of the binary counter 204, can be transferred in parallel to the parallel in, serial out Memory Register 202 by the application of the Parallel Data Set signal on the SET programmable input 210. The count may then be shifted out of the Memory Register 202, Least Significant Bit first, to the transmitter portion of the Bus Interface Circuit 76 in response to the application of clock pulses on the CK line 38, as enabled by the Clock Enable signal on the CLK programmable input 206. The binary counter 204 may be cleared at any time by the application of a reset signal on the R programmable input 208.

The interconnection, for control purposes, of Counter Logic Circuits 200 as a Counter Functional Plane is strictly analogous to the interconnection of the Accumulator Logic Circuits 172 in the accumulator function plane 166. The corresponding programmable inputs of the Counter Logic Circuits 200 are respectively connected together and further connected to the parallel lines of its corresponding configuration Bus 56. Thus, the operation of the Counter Logic Circuits 200 of a Counter Functional Plane is both common and synchronous.

H. Comparator Functional Plane

Figure 12:
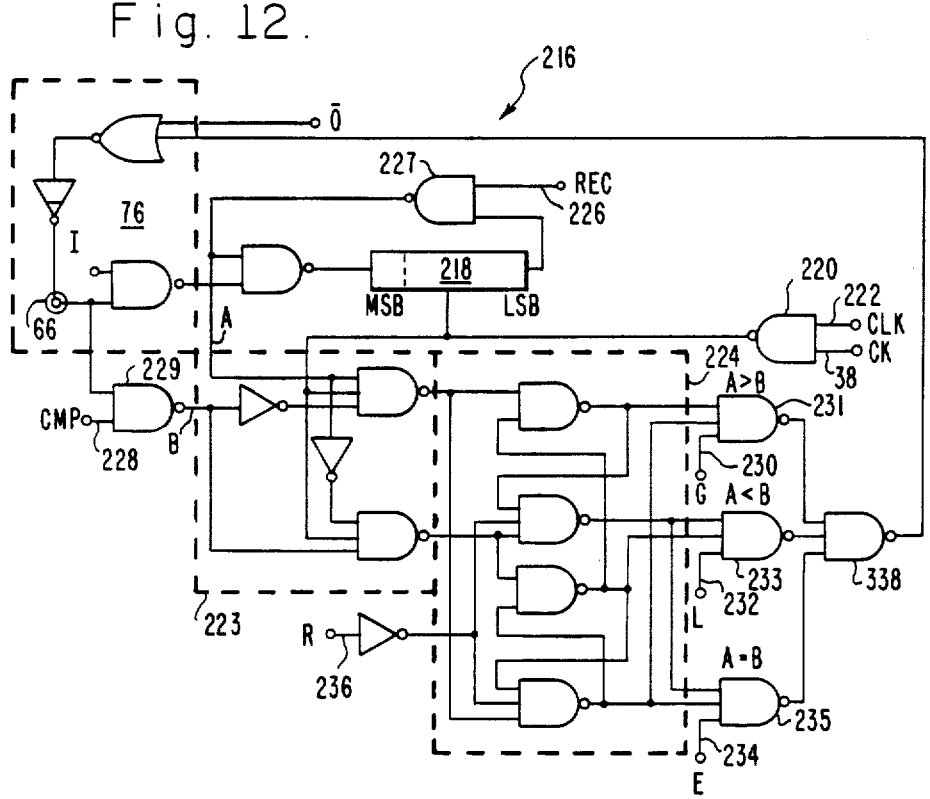
FIG. 12 is a schematic block and circuit diagram of the memory register and Input Programmable Logic Circuit of a comparator functional type of module.

A Comparator Input-Programmable Logic circuit 216 is shown in FIG. 12. Table V provides a listing and functional description of each of its programmable inputs and, equally, of its corresponding functional plane. The Comparator Logic Circuit 216 utilizes a three-step procedure to compare two data words. In the first step, a data word is received from the Data Bus 66 by the Bus Interface Circuit 76 and input into the Memory Register 218. This is done by serially shifting in the data word through the Most Significant Bit position of the Memory Register 218 in response to the application of clock pulses as provided via the NAND gate 220 by the Clock Enable signal on the CLK programmable input 222. This step is performed without providing for the recirculation of the data previously present in the Memory Register 218. That is, a logical zero is applied to the REC programmable input 226, thereby disabling the recirculation of data. The second step is the actual performance of the comparison of the data now present in the Memory Register 218 with a second data word serially provided to the logic circuit 216 over the Data Bus 66. The two data words are serially applied, least significant bit first, simultaneously to the respective inputs of the Comparator Subcircuit 223. The first data word is applied to the A input of the Comparator Subcircuit 223 by enabling the recirculation of the data word present in the memory register 218. The second data word is transferred directly from the Data Bus 66 to the B input of the Comparator Subcircuit 223 by the Compare NAND Gate 229 which is enabled by the Compare Enable signal on its CMP programmable input 228. As the two data words are serially applied, the comparator subcircuit 223 compares their corresponding bits, the cumulative result of the comparisons being stored by the Comparator State Output Latch 224. That is, the Comparator State Output Latch 224 develops three outputs, Greater Than, Less Than and Equal To, that continuously reflect the state of the comparison of the two data words. The three outputs of the Comparator State Output Latch 224 are, as implied, latched, thereby retaining the state of the cumulative comparisons until reset by the application of a reset signal on the R programmable input 236. Naturally, the second, or serial comparison, step is finished when the Most Significant Bits of both data words have been compared. The third and final step of the comparison procedure is then to test for a particular comparison state on the outputs of the comparison state output Latch 224. In order to provide this, the outputs of the Latch 224 are respectively connected to three NAND gates 231, 233, 235. The outputs of the three NAND gates combined by means of the triple input NAND gate 338, with the output thereof being provided to the Bus Interface Circuit 76. Each of these gates 231, 233, 235 also has a programmable input, G, L and E, respectively, that can be used to selectively test for any one, or combination of, Comparator State Output Latch conditions, such as $A>B$ or $A \geq B$. Thus, if the results of a comparison between two data words is such that the first is greater than the second, following the second step of the procedure, then the $A>B$ output of the Comparator State Output signals are applied to the G and E programmable inputs 230, 234, respectively, in the third step of the procedure, then the triple input NAND gate 238 will transfer a logical 1 to the Bus Interface Circuit 76, indicating that the result of the comparison was that the first data word was either greater than or equal to the second.

As with the Counter Functional Plane, the interconnection of the Comparator Logic Circuits 216 in the comparator functional plane, for control purposes, is strictly analogous to the interconnection of the Accumulator Logic Circuits 172 in the accumulator plane 166. The corresponding programmable inputs of the Comparator Logic Circuits 216 are respectively connected together and further connected to the parallel lines of their corresponding configuration Bus 56. Thus, the operation of the Comparator Logic Circuits 216 of a comparator functional plane is inherently both common and simultaneous.

I. Data Exchange Subsystem

As previously explained, the Data Exchange Subsystem, as shown in FIG. 5a, operates to permit any of the Modules 58 within its respective composite Elemental Processor 60 to synchronously either transmit data onto or receive data from the Data Bus 66. The Data Exchange Subsystem also provides for the functional disconnection of inactive modules from the Data Bus 66.

TABLE V

| Bit | Mnemonic | Name | Active State | Function |
|---|---|---|---|---|
| | | Configuration Bus Inputs for Comparator Functional Plane | | |
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | REC | Recirculated | High | Enables the recirculation of the memory register data during shifting. |
| 5 | R | Reset | High | Resets the Comparator State Output Latch. |
| 6 | CMP | Compare | High | Enables the transfer of serial data from the data bus to the Comparator Subcircuit. |
| 7 | G | Greater Than | High | Enables the output of the greater than comparator state latch. |
| 8 | L | Less Than | High | Enables the output of the less than comparator state latch. |
| 9 | E | Equal To | High | Enables the output of the equal to comparator state latch. |
| | | Additional Inputs and Outputs | | |
| | CK | Clock | Pulse | Shifts the data in the meomory register one position to the right; edge sensitive, low when inactive. |

In order to provide these functions, the Data Bus Subsystem 74 includes a Data Bus 66, a resistive load 78, a number of data receivers operatively connected to the Data Bus 66 for sensing the logic state of the data signal present thereon, and a number of data transmitters operatively connected to the Data Bus 66. In the case of the Data Exchange Subsystems used to interconnect the Modules 58 of the Elemental Processors 60, these data transmitters and receivers can be paired to form a plurality of identical Data Bus Interface Circuits 76a-n, each being present in a respective module of the composite Elemental Processor 60. The resistive load 78 is a resistor or, preferably, a resistively connected FET, that is connected between the electrically conductive bus line 66 and a voltage potential source (not shown), the voltage potential being sufficient to normally maintain the Data Bus 66 in a logical 1 state.

The preferred design of the Bus Interface Circuits 76, and therefore of the data transmitters and receivers, is described in conjunction with the memory input-programmable Logic Circuit 102, Section II D supra. Their essential features are as follows: (1) that the data output buffer 86 of the transmitter portion of the circuit 76 be of an open collector design, such as shown in FIGS. 5b-c; (2) that, when the Output Enable signal is applied to the $\overline{O}$ programmable input 84, data provided to the Bus Interface Circuit 76 on the data line 82 is transmitted onto the Data Bus 66; (3) that, when the Output Enable signal is withdrawn from the $\overline{O}$ programmable input 84, the Bus Interface Circuit generate and continuously transmit a logical 1 onto the Data Bus 66; and (4) that, when the Input Enable signal is applied to the I programmable input 92, data is received from the Data Bus 66 and made available on the data line 93. It should be apparent then that, when transmitting data, each Bus Interface Circuit 76 has the capability only to force the logic state of the Data Bus 66 to the logical zero state. Therefore, it is only when all of the Bus Interface Circuits 76a-n are transmitting a logical 1, either as data or to functionally disconnect their respective module from the Data Bus 66, that the logic state of the Data Bus 66 is a logical 1. Conversely, if any of the Bus Interface Circuits is transmitting a logical zero, the Data Bus 66 will be in a logical zero state. Thus, the Data Exchange Subsystem effectively provides the wired AND of all of the data being transmitted onto the Data Bus 66 to those Bus Interface Circuits 76 configured to receive data. Conflicts in the data being transmitted are, thereby, resolved by the consistent application of a logical AND rule. The desirable consequence of this is that it permits data-dependent processing by the Array Processor 66 whenever data is being transferred between functional planes. That is, the conflict resolving capability of the Data Exchange Subsystems of the Array Processor 61 can be intentionally invoked by causing two or more images to be transferred between functional planes simultaneously. The data actually transmitted by each of the Data Exchange Subsystems is naturally dependent on the respective data contained in the transmitting Modules 58 of each Elemental Processor 60. Consequently, the Array Processor 51 is capable of performing data dependent, or masking, operations wherein the resultant image is directly dependent on the respective data present in two or more images. This feature will be explained further by example in Section III(E) infra.

The common usage of the Bus Interface 76 to connect the input-programmable logic circuits to their respective Data Busses 66 substantially reduces the overall complexity of the Elemental Processors 60 and, therefore of the entire Array Processor 61. It permits the logic circuits to be designed and implemented substantially, if not totally independent of one another; the design being constrained only to the requirements of input programmability, the use of bit-serial arithmetic and data manipulation, and the utilization of a Bus Interface 76. By providing for the common interconnection of an Elemental Processor's modules (which correspond to the highly interconnected subcomponents of the prior art's "cell" Elemental Processors) via a single Data Bus 66, the architecture of the Elemental Processors 60 is simplified.

The Data Exchange Subsystem also simplifies the alteration or extension of the architecture of the Elemental Processors 60. Since each Module 58 connects to its respective Data Bus 66 via a single data line 90 that is common to both the data transmitter and receiver of its Bus Interface 76, Modules 58 can be either added or removed from an Elemental Processor by appropriately connecting or disconnecting their data lines 90 from the Data Bus 66. Further, the architecture may be extended without any direct effect on the optimization or speed of the Elemental Processor. It is only the practical limitation of signal propagation delays along the length of the bus line 66 that limits the number of Modules 58 that may be present in a composite Elemental Processor 60.

The Data Exchange Subsystem, however, is not limited to being used only to interconnect the Modules 58 of the Elemental Processors 60. It may be advantageously used anywhere serial data must be exchanged between a number of logic circuits via a bus line. For example, a functionally equivalent Data Exchange Subsystem is utilized to interconnect the Parallel/Serial Converter 18 of the Control Processor 10 with all of the I/O Functional Planes of the Array Processor 61. A resistive load 78, as shown in FIG. 2, is connected to, and normally maintains, the DI data bus 46 in a logical 1 state. The output buffer 86 of the data transmitters 155 present on each I/O Functional Plane (see FIG. 8) for driving data onto the DI data bus 46 is intentionally of an open collector design. Further, the disabled state of the data transmitters 155 is such that they continuously drive a logical one onto the DI data bus 46. Naturally, the data receiver of the I/O Data Exchange Subsystem is the Serial/Parallel Converter 18, the receiving of data being enabled by the clock pulses as provided on the CK line 38. Thus, all of the I/O Functional Planes are commonly connected to the Converter 18 of the Control Processor 10 by an I/O Data Exchange Subsystem.

It should also be understood that Data Exchange Subsystems could easily be operated in parallel in order to transfer parallel data words.

III. OPERATION

A. Level Shift

As previously mentioned, the principal operation of the Array Processor 61 in the processing of an image is to consecutively shift the image's constituent data words in parallel through a succession of functional planes. These level shifts can be utilized to implement the particular steps of a desired image processing algorithm by shifting the image data set, along with ancillary or image derivative data sets, through a succession of functional planes of appropriate types.

The particular steps necessary to perform a level shift involving a number of functional planes are shown in the system timing diagram of FIG. 13. At t₁, the Control Processor 10 issues a Configuration Latch Reset signal to the Processor Interface 63 via the Latch Reset line 26. This signal resets the data bits in all of the Configuration Latches 52 to the inactive state of their corresponding programmable inputs. Next, the Control Processor 10 successively addresses any number of the interface circuits 49 of the Processor Interface 63, writing a control word into each of their Configuration Latches 52. Naturally, each of these control words is functionally defined only in terms of the functional plane corresponding to the Interface Circuit 49 to which they are addressed. The control word for configuring a functional plane to perform a particular function can be determined by resort to the Tables I-V. For example, to configure a memory functional plane for a level shift of the data contained in its memory registers, while preserving the data via recirculation within each module, reference is made to Table I to develop the desired control word as shown in Table VI. Referring now to FIG. 13, the Control Processor 10 configures three functional planes at t2, t3, and t4, respectively. As previously explained, as the Address Decoder 50 of each Interface Circuit 49 is addressed, a latch enable signal is generated that, in turn, causes its corresponding Configuration Latch 52 to latch-in a control word. This may be referred to as a configuration cycle. Once the configuration cycles for the functional planes that are to be active during the level shift are executed, the remaining functional planes within the Array Processor 61 being left unconfigured and therefore inactive, the Control Processor 10 issues, at t5, the clock down-count number to the Clock Counter and Gate 16. The down-count number is latched into the Clock Counter and Gate 16 by the clock count enable signal at t6. This signal also initiates the down-count sequence to provide the preselected number of clock pulses, as specified by the down-count number, onto the CK line 38. In response to each of these clock pulses, the active functional planes either transmit or receive, depending on their configuration, a single data bit via their Data Exchange Subsystems. Thus, as is shown in FIG. 13, an entire image consisting of data words 16 bits in length can be level shifted between functional planes by the provision of a clock down-count number equal to 16. At t7, the down-count sequence ends and the Clock Counter and Gate 16 generates and provides a clock count complete signal to the Computer System 12, thus indicating that the level shift operation is complete.

B. Lateral Shift

Another basic operation of the Array Processor 61 is the array lateral shift. Though it is a basic operation, it is limited only to those functional planes provided with nearest neighbor serial data transfer capabilities, such as the memory and I/O Functional Planes. During the lateral shift operation, the image present in one of these functional planes is laterally shifted in any one of the four orthogonal directions within its functional plane without loss of the image's spatial integrity. The image's integrity is preserved by virtue of the wrap-around nearest neighbor interconnections between the modules located on the north and south and the east and west edges of the NxN module array. This allows data figuratively shifted over the edge of the array to reappear at its corresponding opposite edge. Further, since images are each present in a different functional plane, any number of images can be laterally shifted in totally independent directions simultaneously.

Figure 14:
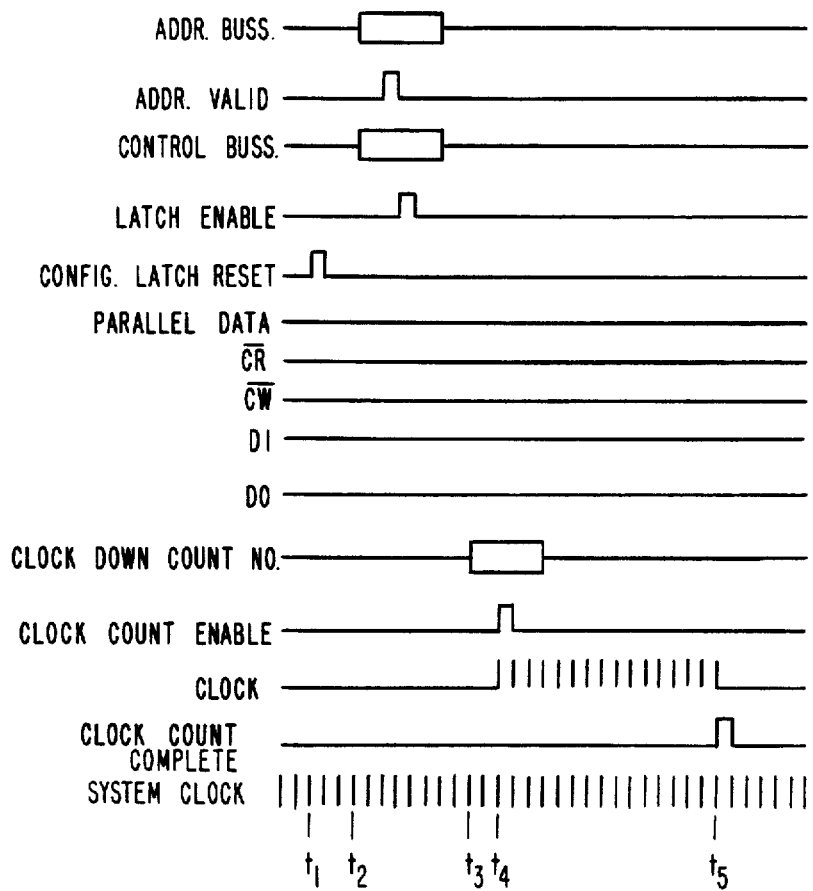
FIG. 14 is a schematic timing diagram for explaining the data lateral shift operation of the Memory Functional Plane of FIG. 7.

The state timing diagram of FIG. 14 shows the particular steps necessary to perform a lateral shift operation. As in the level shift operation, the lateral shift begins with the Control Processor 10 issuing a control latch reset signal at t₁. The Control Processor 10, at t₂, then configures one or more of the functional planes to perform lateral shift operations, only one such configuration cycle being shown in FIG. 14. As an example, the control word necessary to configure a Memory Functional Plane to perform a lateral shift operation is provided in Table VII. This control word configures the Memory Functional Plane to perform an east lateral shift of the image contained in the functional plane. At t₃, again similar to the level shift operation, the Control Processor 10 issues the clock down-count number to the Clock Counter and Gate 16. The clock Down-Count Enable signal, issued at t₄, latches in the down-count number and initiates the down-count sequence which provides the preselected number of clock pulses on the CK line 38. In response, the data words are serially shifted out of the modules 102 and into their respective east nearest neighboring modules 102. At the conclusion of the down-count at t₅, the Clock Counter and Gate 16 generates and provides a clock count complete signal to the Computer System 12, indicating the completion of the lateral shift operation.

TABLE VI

| CONTROL WORD | BIT FUNCTION |
|---|---|
| (MSB) 0 0 0 0   0 0 0 0   0 0 1 0   1 0 0 0 (LSB) | (1) Input disabled<br>(2) Output Enabled<br>(3) Polarity non-inverted<br>(4) Clock Enabled<br>(5) LSB selected<br>(6) Recirculation enabled<br>(7-10) Nearest Neighbor Data In disabled<br>(11-16) Unused |

TABLE VII

| CONTROL WORD | | | | BIT FUNCTION |
|---|---|---|---|---|
| (MSB) 0 0 0 0   0 0 0 0   1 0 0 0   1 0 1 0 (LSB) | | | | |

- (1) Input disabled
- (2) Output disabled
- (3) Polarity non-inverted
- (4) Clock Enabled
- (5) LSB selected
- (6) Recirculation disabled
- (7) North Data In disabled
- (8) East Data In enabled
- (9) South Data In disabled
- (10) West Data In disabled
- (11–16) Unused

C. Data I/O

The previous two basic operations generally deal with the movement, or translation, of images within the Array Processor 61. The Data I/O Operation, however, provides for the serial transfer of entire images between the Computer System 12 of the Control Processor 10 and an I/O Functional Plane 152 of the Array Processor 61.

Figure 15:
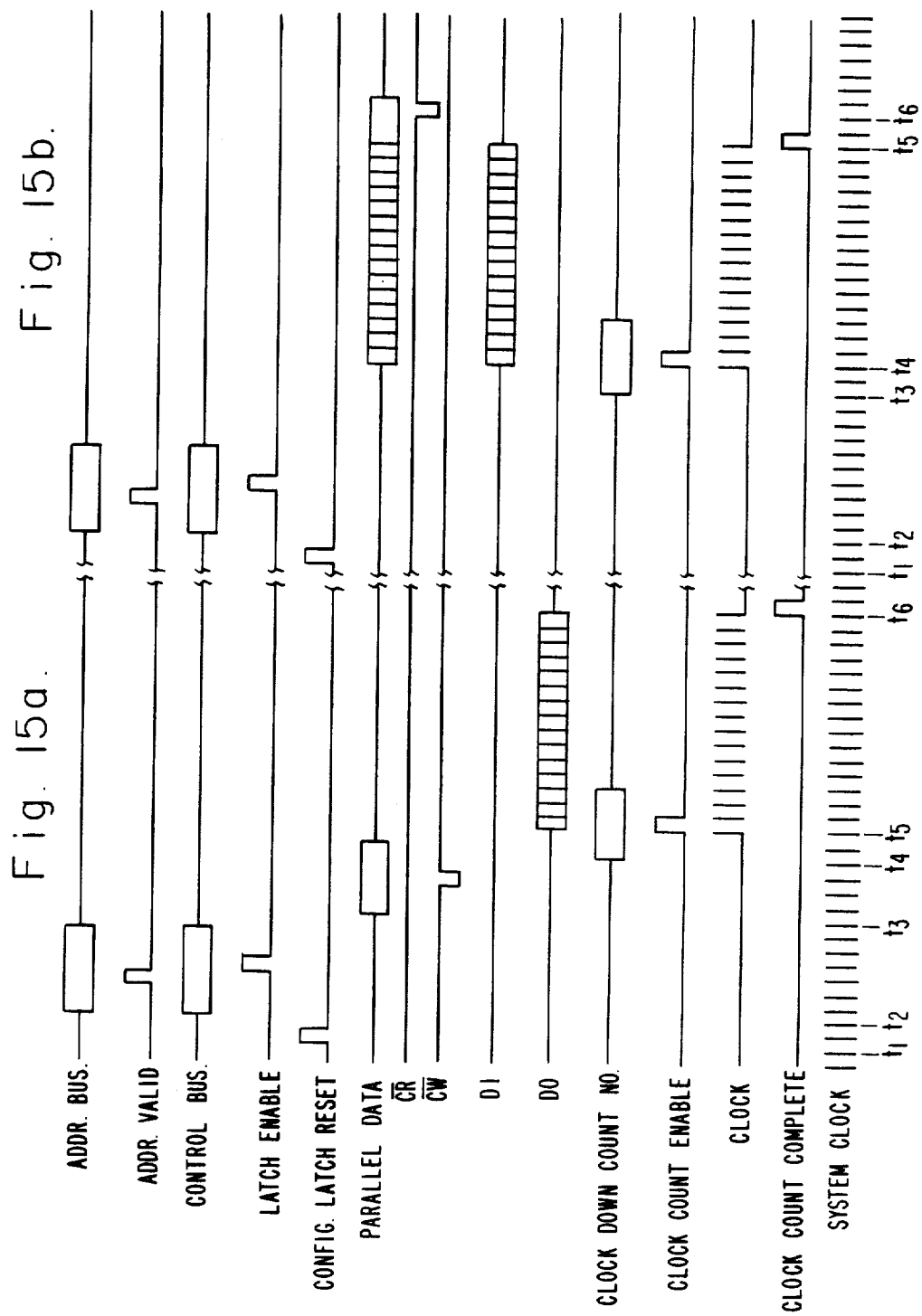
FIGS. 15a and b are schematic timing diagrams for explaining the serial input/output data exchange operation of the I/O Functional Plane shown in FIG. 8.

The Data I/O Operation can be divided, for purposes of discussion, into Image Data Out and Image Data In suboperations. The system timing diagrams showing the principal portions of these operations are shown in FIGS. 15a–b, respectively. In the image data out operation, an image is transferred from the Control Processor 10 to the Array Processor 61. This transfer is accomplished through the use of a two-step procedure. Referring now to FIG. 15a, the first step begins at $t_1$ with all of the Configuration Latches 52 of the Processor Interface 63 being reset to their respective inactive states. At $t_2$, the Control Processor 10 executes a configuration cycle to configure an I/O Functional Plane 152 for a data input, lateral shift east operation. The necessary control word is essentially identical to that necessary to perform a Memory Functional Plane lateral shift east operation, as described in Section III(B), the only exception being that the EXIO bit (bit 11) is set to a logical 1 to enable the operation of the I/O input Data Receiver/Selector 154 and the I/O output Data Transmitter Circuit 155. Next, at $t_3$, the Computer System 12 provides the Converter 18 with the first data word of the image data set. As soon as it is stable on the bidirectional Data Bus 40, it is latched into the Converter 18 by a negative logic converter write signal on the $\overline{CW}$ control line 44. The Computer System 12 then issues, at $t_4$, a clock down-count number to the Clock Counter and Gate 16, the number being preferably equal to the bit length of both the data word and the memory registers 118 of the I/O Functional Plane 152. At $t_5$, the Computer System 12 issues the clock count enable signal, thereby latching the down-count number into the Clock Counter and Gate 16 and initiating the down-count sequence. The Converter 18, in response to the clock pulses, serially transmits the image data word onto the DO line 48. The image data word is synchronously received and serially shifted into the Memory Register 118 of the Memory Module $102_{1,1}$ of the I/O Functional Plane 152. The down-count sequence concludes at $t_6$ with the entire image data word having been transferred to the corner module $102_{1,1}$ of the top row of the I/O Functional Plane's N×N array of Memory Modules 102.

The portion of the first step of the data output operation beginning at $t_3$ and ending at $t_6$ is then repeated N-1 times. Each time this operation is repeated, a new data word from the image data set is provided to the top row, corner module $102_{1,1}$, with the data words previously present there being successively laterally shifted to their east nearest neighboring modules $102_{1,1}$ to $102_{1,n}$. As should be apparent, an entire row of the I/O Functional Plane 152 is thus provided with a portion of the image.

The second step of the data output operation involves shifting the data contained in the top row of modules 102 south by one row. This can be accomplished by executing an image lateral shift south on the I/O Functional Plane 152. The lateral shift south is strictly analogous to the lateral shift east operation, with bit 9 being set instead of bit 8.

These two steps are successively repeated until the entire image data set has been transferred from the Control Processor 10 to the I/O Functional Plane 152 of the Array Processor 61. During the operation therefore, the flow of data words is west to east and north to south, with the initial data word ultimately being stored in the bottom row, corner module $102_{n,n}$ and the final data word being stored in the top row, corner module $102_{1,1}$. This orderly flow of data permits the image to be simply and efficiently mapped into the memory registers 118 of an I/O Functional Plane 152.

The data input operation, which transfers an image from the Array Processor 61 to the Computer System 12, is substantially analogous to the data output operation. Referring to FIG. 15b, at $t_1$, the Configuration Latches 52 of the Processor Interface 63 are reset and, at $t_2$, the Control Processor 10 executes a configuration cycle to configure an I/O Functional Plane 152 for the data input operation. This configuration is the same as used in the data output operation previously described, the EXIO signal enabling the data transmitter 155 as well as the Data Receiver/Selector 154. At $t_3$, however, the Computer System 12 issues the clock down-count number and, at $t_4$, initiates the down-count sequence by issuing the clock Down-Count Enable signal. In response to the CK pulses, data from the Memory Register 118 of the bottom row, corner module $102_{n,n}$, as present on its Nearest Neighbor Data Output line 160, is transmitted via the Data Transmitter Circuit 155 onto the DI line 46. The serial data so derived is synchronously clocked into the Converter 18. At the end of the down-count sequence, at $t_5$, the data word previously present in the bottom row, corner module $102_{n,n}$ has been transferred to the Converter 18. Thus, after the Computer System 12 receives the Clock Down-count Complete signal at $t_5$, it issues the negative logic converter read signal, at $t_6$, on the $\overline{CR}$ control line 42 and reads the parallel converted data word present in the Converter 18. The sequence of events beginning with $t_3$ and ending with $t_6$ is then repeated N-1 times, thereby transferring all of the data words from the bottom row of modules 102 in the I/O Functional Plane 152 to the Computer System 12. Thus, in order to transfer an entire image from the Array Processor 61 to the Computer System 12, the above step is repeated in succession with a lateral shift south operation until the data initially present in the top row of modules has been shifted to the bottom row of modules and further shifted laterally through the bottom row, corner module $102_{n,n}$.

The image data out and image date in suboperations have been described separately for purposes of discussion only. They may be performed separately or simultaneously with the use of a concurrently operating serial-in, serial-out Converter 18. For simultaneous image exchange, the data in and data out suboperations are overlapped, so that prior to each down-count sequence, a data word is written into the Converter 18 and, subsequent to the down-count sequence, a data word is read from the Converter 18. Thus, during the down-count sequence, a data word from the Array Processor 61 is serially shifted into the Converter 18 to replace the data word that is simultaneously being shifted to the Array Processor 61. Considering the identical shifting sequences of the suboperations, it is apparent that the data words so exchanged are read from and written to the same relative location within their respective image data sets. Consequently, entire image data sets, or respective portions thereof, may be simply exchanged between the Control Processor 10 and the Array Processor 61.

It should also be understood from the discussion of the I/O Data Exchange Subsystem in Section II, supra, that any number of image data sets may be transferred simultaneously from an equal number of I/O Functional Planes 152 present in the Array Processor 61 to the Control Processor 10. To do so, the I/O Functional Planes 152 need only be commonly configured to transmit their respective data onto the DI bus line 46. Thus, during the down-count sequence, the AND of the corresponding data words from the several image data sets is provided to the Converter 18.

E. Example

The above-described basic operations of the Array Processor 61 can be utilized, in combination with a variety of types of functional planes, to perform practically any image processing algorithm. To illustrate the general operation of the Array Processor 61 executing an algorithm, an example is provided below.

UNSIGNED MULTIPLY EXAMPLE

The following "program" provides for the unsigned multiplication of one image data set by another. The multiplicand image data set is provided in one Memory Functional Plane (MEM 1) while the multiplier is in a second Memory Functional Plane (MEM 2). The data words present in the positionally corresponding modules of the Memory Functional Planes will be multiplied with the interim, and ultimately the final, product being present in the similarly corresponding modules of an Accumulator Functional Plane (ACC 1).

The multiplication algorithm that is implemented by the "program" uses the simple "shift and add" technique. As will be seen, the multiplier data words are shifted by one bit between each serial addition. While not essential to the example, a counter of functional plane (CNT 1) is provided to develop the bit sum of the multiplier data words in each of its positionally corresponding modules to illustrate its operation.

The multiplicand and multiplier data sets may be considered to be ancillary data sets to one another. The multiplication product and the counter bit sum data sets may be considered image derivative data sets.

For purposes of the example, the data words are given as 4 bits in length and the module memory registers are given an 8 bits in length. The data words are present in the lower 4 bit positions of their respective memory registers while the high 4 bit positions are 0.

| | PROGRAM | | |
|---|---|---|---|
| Line No. | Functional Plane Addressed | Corresponding Configuration Bus Lines Set Active | Control Processor Operation Performed |
| 1 | ACC 1 | ADD, CLK | Configuration Cycle |
| 2 | CNT 1 | R | Configuration Cycle |
| 3 | | | issue 8 CK pulses |
| 4 | | | reset configuration latches |
| 5 | MEM 1 | REC. $\overline{O}$, CLK | Configuration Cycle |
| 6 | MEM 2 | O | Configuration Cycle |
| 7 | ACC 1 | REC. I, CLK | Configuration Cycle |
| 8 | | | issue 8 CK pulses |
| 9 | | | reset configuration latches |
| 10 | MEM 1 | REC. CLK | Configuration Cycle |
| 11 | | | issue 7 CK pulses |
| 12 | | | reset configuration latches |
| 13 | MEM 2 | REC. CLK, $\overline{O}$ | Configuration Cycle |
| 14 | CNT 1 | I | Configuration Cycle |
| 15 | CNT 1 | (all inactive) | Configuration Cycle |
| 16 | | | issue 1 CK pulse |
| 17 | | | reset configuration latches |
| 18 | | | Do program lines 5 through 16 until they have been performed 4 times. |
| 19 | CNT 1 | SET | Configuration Cycle |
| 20 | | | reset configuration latches |

| Line Ref. No. | Comments |
|---|---|
| 1-4 | the ACC 1 data words are cleared and the modules are set for addition, and the CNT 1 counters are reset. |
| 5-9 | the bits of the multiplicand data words are successively ANDed with the present LSB's of the multiplier data words by means of the Data Exchange Subsystem and added to the previous accumulator data words, respectively. This conditional, or data dependent, addition effectively multiplies the multiplicands by the LSB of the multipliers. |
| 10-12 | the multiplicand data words are shifted left by one bit to adjust the decimal point for the next multiplication. the one bit shift left being accomplished by a 7 bit shift right. |

| | PROGRAM |
|---|---|
| 13-17 | the multiplier data words are shifted right by one bit so that the multiplicands are effectively multiplied by the next greater significant bit of the multiplier data words; the multiplier bits shifted are bit summed by the respective counters. |
| 18 | lines 5 through 17 are performed once for each significant bit of the multiplier data words, or a total of 4 times in the present example, so that the accumulator data words are the product of the respective multiplicand and multiplier data words. |
| 19-20 | the bit counts of the multiplier data words are latched into their respective counter module memory registers. |

Considering a single Elemental Processor having the following initial data words in its indicated modules, the above program would develop the following final product.

| Program Point | MEM 1 | MEM 2 | ACC 1 | CNT 1 |
|---|---|---|---|---|
| Initial | 00001110 | 00000101 | Don't care | (Don't care)* |
| Line 4 | 00001110 | 00000101 | 00000000 | (00000) |
| Line 17, loop 1 | 00011100 | 10000010 | 00001110 | (00001) |
| Line 17, loop 2 | 00111000 | 01000001 | 00001110 | (00001) |
| Line 17, loop 3 | 01110000 | 10100000 | 01000110 | (00010) |
| Line 17, loop 4 | 11100000 | 01010000 | 01000110 | (00010) |
| Line 19 | 11100000 | 01010000 | 01000110 | 00010 |

*The numbers in ( )'s being at the outputs of the counter circuit.

IV. DETAILED DESCRIPTION OF THE PRESENT INVENTION

A. Segregator Functional plane

Figure 16:
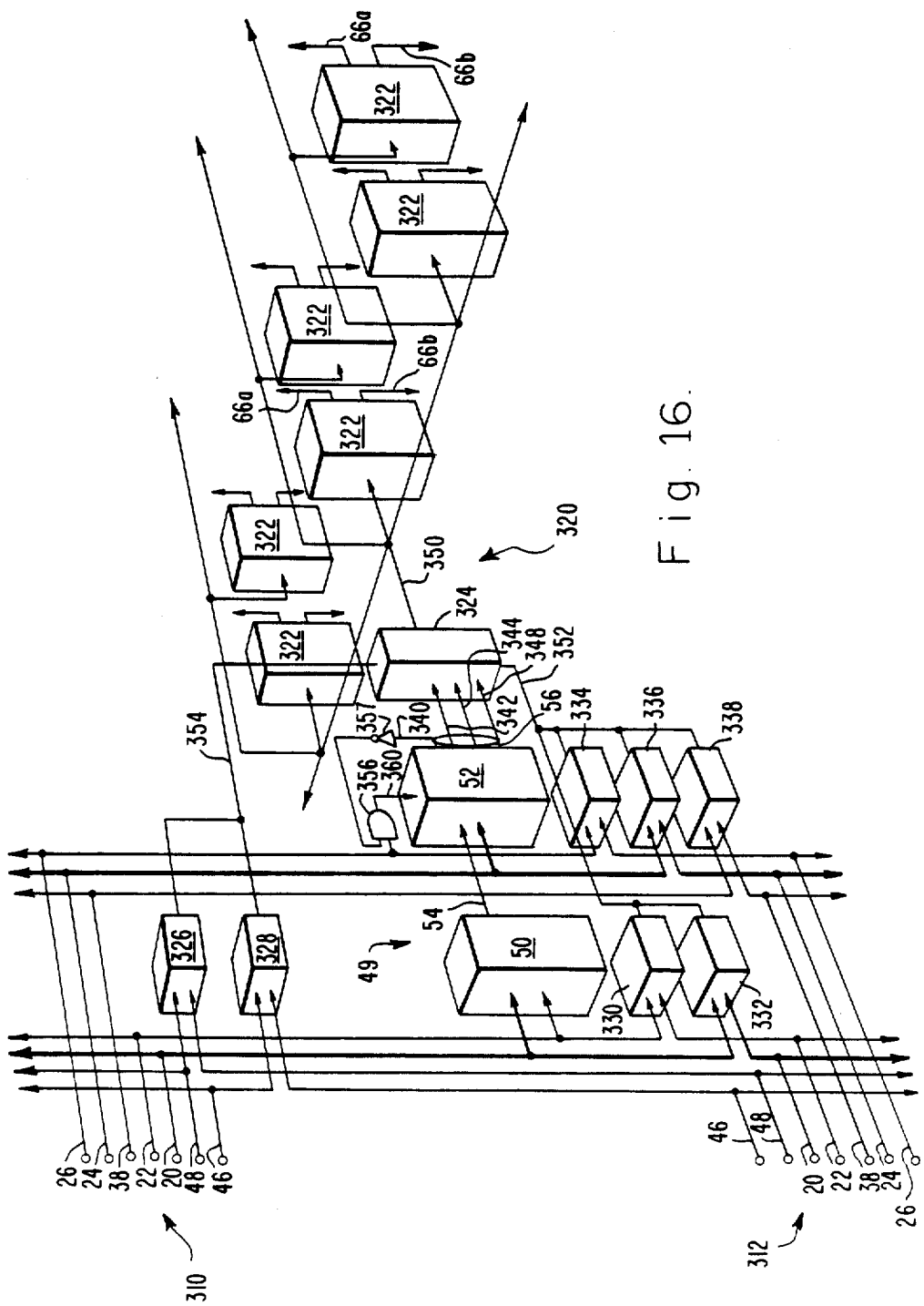
FIG. 16 is a schematic block and circuit diagram of a Bus Segregator according to the present invention.

The present invention provides a highly specialized Segregator Functional Plane 320, shown in FIG. 16, that allows any number, or subset, of the Array Processor's Functional Planes to be dynamically segregated, either in terms of their control or ability to exchange data, or both, from the remainder.

Referring now to FIG. 16, a Segregator Functional Plane 320 includes an interface circuit 49 (similar to the one shown in FIG. 3 and is comprised of the address decoder 50, configuration latch 52, and gates 356, 357), a Multiple Switch Control Input Buffer/Driver 324, and three sets of electronically activatable switches for selectably severing (1) the Array Processor's data bus lines 66 (2), the address bus 20, address valid 22, control bus 24, configuration latch reset 26, and clock 38 lines, and (3) the DI 46 and DO 48 lines, resepectively. (These lines make up what may be referred to as the Array Processor's or, more specifically, the Processor Interface's composite bus.) The Address Decoder 50 and Configuration Latch 52 are interconnected to one another and are further connected to the Control Processor 10 to form an essentially standard interface circuit 49. Table VIII provides a listing and functional description of those bits of the Configuration Latch 52 that have an assigned function with respect to the Segregator Functional Plane 320. The interface circuit 49 differs from the other interface circuits 49 of the Processor Interface 63 in that the External Reset Disable signal, as provided on the EXRD line 340 of the configuration bus 56, is fed back through an inverter 357 to be combined by the AND gate 356 with the configuration Latch Reset signal as provided by the Control Processor 10 on the configuration latch reset line 26. The combined signal is then provided to the Configuration Latch 52 on its latch reset line 360. Thus, when the External Reset Disable signal is active, the Configuration Latch Reset signal is prevented from reaching the Segregator Functional Plane's Configuration Latch 52. This allows a Segregator Functional Plane 320 to be particularly configured during a control processor configuration cycle and to remain so configured even though the Control Processor 10 issues a Configuration Latch Reset signal to reset all of the other Configuration Latches 52 of the Processor Interface 63. In this case, in order to alter the configuration of the Segregator Functional Plane 320, or reset its Configuration Latch 52, the Control Processor 10 must then execute another configuration cycle to write an appropriate control word to the Segregator Functional Plane's Configuration Latch 52.

TABLE VIII

| Bit | Mnemonic | Name | Active State | Function |
|---|---|---|---|---|
| Configuration Bus Inputs for the Segregator Functional Plane | | | | |
| 1 | DCH | Data Chop | High | Opens the switches in the data bus lines of the elemental processors. |
| 2 | ACCH | Address/Control Chop | High | Opens the switches in the address and control busses and the address valid, latch reset, and CK lines. |
| 3 | I/OCH | Data I/O Chop | High | Opens the switches in the DI and DO lines. |
| 4 | IR | Internal Reset | High | Resets the configuration latch including the Internal Reset bit. |
| 5 | EXRD | External Reset Disable | High | Disables the configuration latch from responding to the configuration latch reset signal. |
| Additional Inputs and Outputs | | | | |
| | CK | Clock | Pulse | Shifts the data in the memory register one position to the right; edge sensitive; low when inactive. |

The remaining lines of the configuration bus 56, consisting of the Data Chop (DCH) 342, Address/Control Chop (ACCH) 344, and Data I/O Chop (I/OCH) 348 lines, are connected to the Multiple Switch Control Input Buffer/Driver 324 to allow for the selective activation of each of the switch sets.

The first switch set is present within an array of Pseudo-Modules 322. These Pseudo-Modules 322 are associated so as to architecturally correspond to the module arrays of the other functional planes within the Array Processor 61. Since a Segregator Functional Plane 320, and therefore its pseudo-module array, architecturally occupies an entire array level of the Array Processor 61, a Pseudo-Module 322 is provided between architecturally corresponding Modules 58 of each Elemental Processor 60 of the Array Processor 61. Thus, the inclusion of Segregator Functional Planes 320 in the Array Processor 61 effectively divides the Array Processor 61 into a plurality of subsections, each including a number, or subset, of the Array Processor's functional planes.

Figure 17:
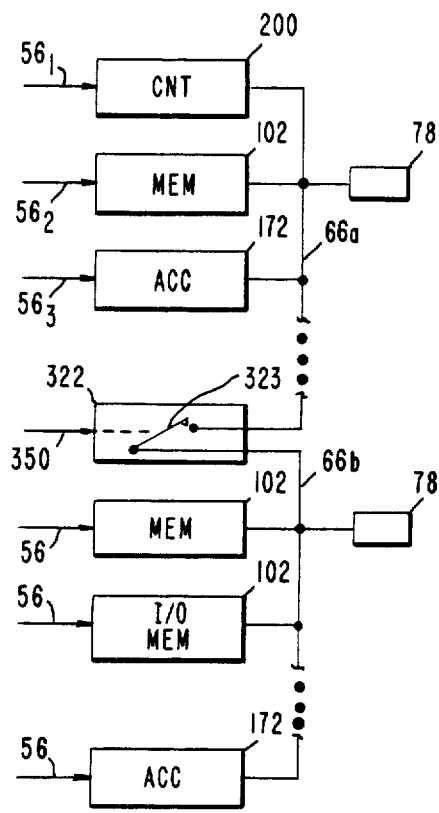
FIG. 17 is a schematic block diagram of an Elemental Processor including a bus switch pseudo-module that allows for the selective segregation of portions thereof.

Referring now to a representative segregatable Elemental Processor 60, as shown in FIG. 17, each Pseudo-Module 322 includes an electronically activatable switch 323 that has a switch control input terminal and a pair of signal transfer terminals. Suitable electronically activatable switches 323 include CMOS, MOSFET, JFET, and triac bilateral switches. The signal transfer terminals of the electronic switches 323 are electrically connected to the data bus lines 66 of their respective Data Exchange Subsystems 74, such that the data signal paths of the Subsystems 74 are continous only through the switches 323, and then only when the switches 323 are not activated. Thus, as shown in FIG. 17, an electronic switch 323 can be used to effectively open circuit, or functionally sever, an elemental processor data bus 66 into functionally isolated data bus segments 66a, 66b. Consequently, those Modules 58 associated with the respective data bus segments 66a, 66b are also functionally isolated from one another. The switch control input terminals of the Pseudo-Module Switches 323 are electrically interconnected and further connected by a pseudo-module switch control line 350 to the Multiple Switch Control Input Buffer/Driver 324. Thus, in response to an active Data Chop signal on the DCH line 342 of the configuration bus 56, the Buffer/Driver 324 activates all of the electronic switches 323 of the Pseudo-Modules 322, thereby segregating the module arrays of the functional plane subsets architecturally present on either side of the segregator functional plane 320 from one another in terms of data exchange. It should be understood that that the multiple Buffer/Driver 324 is of a standard design appropriate for separately driving the switch control inputs of the particular type of electronic switches 323 utilized in each of the three switch sets.

The second set of electronically activatable switches 323 is provided for the selectable functional severing of the address and control lines of the Array Processor 61. In particular, single electronically activatable switches 323 are provided within each of three switch units 330, 334, 338 to allow for the electrical severing of the address valid line 22, the control latch reset line 26 and the clock line 38, respectively. The remaining two switch units 332, 336 each contain a plurality of parallel switches 323 that provide for the electrical severing of the address bus 20 and the control bus 24, respectively. Naturally, the number of parallel switches 323 in these switch units 332, 336 is equal to the number of lines in their respectively associated busses. The electrical connection of the several switch signal terminals of the second switch set to their corresponding address and control lines is strictly analogous to the electrical connection of the switch signal terminals 323 of the pseudo-modules 322 to their respective data bus lines 66. Also, analogously, the switch control inputs of the second switch set are connected together and to the multiple Switch Control Input Buffer/Driver 324 by the switch control line 352. This allows for the simultaneous functional severing of the various address and control lines of the Array Processor 61 when an active Address/Control Chop signal is provided on the ACCH line 344.

The third set of switches 323 are provided for the functional severing of the I/O Data Exchange that interconnects the Control and Array Processors for purposes of data transfer. The third switch set includes a pair of switch units 326, 328, each containing a single electronically activatable switch 323, for functionally severing the DI 46 and DO 48 lines, respectively. The switches 323 of the two switch units 326, 328 are respectively connected to the DO 48 and DI 46 lines in strict analogy to the electrical connection of the pseudo-module switches to their respective data bus lines 66. It should be understood that if additional I/O Data Exchange Subsystems are provided between the Control and Array Processors, additional pairs of switch units 326, 328 could be provided as part of the third switch set to allow for the electrical severing of the additional DO/DI data lines. However, in all cases, the switch control inputs of the switches 323 of the third switch set are electrically connected together and to the Buffer/Driver 324 by means of a switch control line 354. This, as with the other switch sets, allows for the selective activation of the third switch set in response to an active Data I/O Chop signal on the I/OCH line 348 of the configuration bus 56.

Figure 18:
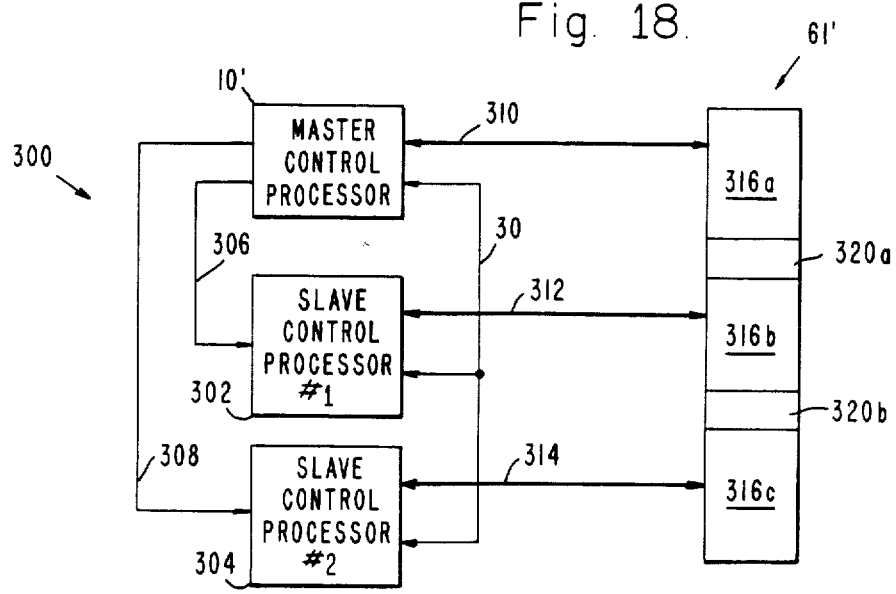
FIG. 18 is a general block diagram of a pipelined Cellular Array Processor System utilizing several bus segregator planes acording to the present invention.

In order to dynamically segregate subsets of the array processors functional planes, a number of Segregator Functional Planes 320 are interspersed throughout the array processor such that a Segregator Functional Plane 320 is architecturally located between each of the adjacent subsets of the array processor's functional planes. Thus, during the operation of the array processor 61, any of the Segregator Functional Planes 320 can be addressed and selectively configured to segregate their adjacent functional plane subsets from one another in terms of their control or data exchange. FIG. 18 illustrates a Segregatable Array processor 61' having a pair of Segregator Functional Planes 320a, 320b that are interspersed between three functional plane subsets 316a-c.

Through the use of Segregator Functional Planes 320, a Segregatable Array Processor 61' may be operated so that each of its functional plane subsets 316 are effectively paralleled, thereby substantially increasing its image resolution handling capability and effective data processing speed. This is accomplished by specifically configuring each of the Segregator Functional Planes 320 to segregate only the data bus lines 66 of the adjacent functional plane subsets 316. Then, providing that the functional plane subsets 316 include corresponding numbers of each type of functional plane and that the Address Decoders 50 of corresonding functional planes are responsive to common addresses, in addition to their own unique address, each of the functional plane subsets 316 can be commonly and simultaneously operated. That is, the Control Processor 10 may simultaneously address and identically configure the corresponding functional plane present within each of the functional plane subsets 316 of the Segregatable Array Processor 61'. This results in the common and simultaneous operation of each of the segregated functional plane subsets 316, thereby permitting the particular image data sets present in each to be processed as if they were simply subsets of a larger image data set. Consequently, it should be apparent that the Segregator Functional Plane 320 permits an Array Processor 61' to be particularly optimized for image processing applications involving extremely large two-dimensionally structured data sets while, at the same time due to the dynamic reconfigurability of the segregator functional planes 320, retaining the broad image processing capabilities required for generalized applications.

The Segregator Functional Plane 320 may also be used to effectively provide for a plurality of functionally separate Array Processors 61. This can be accomplished through the use of a multiple, or master/slave, Control Processor Unit 300, as shown in FIG. 18. The Control Processor Unit 300 is comprised of a Master Control Processor 10' and a number of Slave Control Processors (shown as two Control Processors 302, 303 for purposes of illustration only). The Master Control Processor 10' is operatively connected to the Slave Control Processors 302, 304 by separate slave control lines 306, 308, respectively, for selectively enabling or disabling their operation, and by the system clock generator synchronization line 30 to ensure the simultaneous operation of all of the control processors. Each of the control processors of the Control Processor Unit 300 is operatively connected to a separate functional plane subset 316a-c of the array processor 61' by separate composite bus extensions 310, 312, 314, respectively. Naturally, each of these composite bus extensions 310, 312, 314 includes its respective control processor's address bus, address valid, control bus, configuration latch reset, clock, DI, and DO lines. The connection of the Master Control Processor's composite bus extension 310 and a Slave Control Processor's composite bus extension 312 to the corresponding lines of the processor interface 63 is shown in FIG. 16. In order to prevent conflicts from arising as a result of differing signals being provided to those portions of the composite data bus associated with two adjacent functional plane subsets 316, either the second and third switch sets of an intervening Segregator Functional Plane 320 must be activated or one of the control processors must be disabled such that its interface to its composite bus extension is placed in a high impedance, or tristate, condition as determined by the master control processor 10' and effected by means of a signal on the appropriate slave control line. By completely segregating the functional plane subsets 316 and enabling their respective Control Processors 10', 302, 304, each becomes a functionally separate Array Processor 61 within a Multiple Array Processor System.

The Multiple Array Processor System can be used in a number of different types of data processing applications. One such type of application is where an initial data set must be analyzed in a number of different ways. These varied analyses can be performed concurrently by causing the Master Control Processor 10' to execute a level shift, transferring the initial data set to a functional plane in each of a number of functional plane subsets 316, segregating the subsets 316, and permitting the control processor associated with each to separately, yet concurrently, analyze the image by executing a particular data processing algorithm.

The Multiple Array Processor System can also be used in those types of applications requiring pipeline data processing. That is, as implemented in accordance with the present invention, each control processor within the system concurrently executes a different image processing algorithm on an image present within its associated functional plane subset 316. However, control over the entire Segregatable Array Processor 61' is periodically returned to the Master Control Processor 10'. During this time, it executes a number of level shift operations to move image analysis derivative data sets from the functional plane subsets 316 to their next successive subset 316 in the Segregatable Array Processor 61' (the next processing unit in the 'pipeline'). This allows the Multiple Array Processor System to efficiently process the successive image data sets that are obtained through the use of real time acquisition systems.

It should be realized that the Segregator Functional Plane 320 can be used to optimize the speed and power consumption of a Segregatable Array Processor 61'. There are parasitic capacitances inherently associated with the data bus lines 66 that may be responsible for consuming a substantial percentage of the power dissipated in an Array Processor 61'. A number of Segregator Functional Planes 320 appropriately located and configured so as to functionally isolate those functional planes actively required for the optimum execution of an algorithm from the remainder effectively reduces the parasitic capacitances associated with the data bus lines 66 of the active functional plane subset 316. Thus, the power consumption of the Array Processor 61' is reduced, since the excessive parasitic capacitances need not be driven by the active functional planes. Also, the speed degradation of the Array Processor 61' resulting from the excessive parasitic capacitances is reduced, thereby enhancing the reliability and potential operating speed of a segregated Array Processor 61'.

It should also be realized that any of the above modes of operating a Segregatable Array Processor 61' may be implemented simultaneously, as required in any particular data processing application.

B. Summary

Thus, a Segregator Functional Plane for segregating any number, or subset, of the modular array processor's functional planes from the remainder has been disclosed. The segregator functional plane permits the array processor to be dynamically reconfigurable at any time during the processing of an image data set. Further, several segregator planes may be used either to place in parallel subsets of the functional planes, thereby increasing the speed and resolution capability of the array processor, or to divide out subsets of the functional planes, allowing them to be separately controlled in a pipelined configuration. Also, the segregator functional plane may be used to electrically sever the connections to unused or inactive functional planes, thereby reducing the power consumption of the array processor.

Obviously, many modifications and variations of the present invention are possible in light of the above description of the preferred embodiment. It is therefore to be understood that the invention may be practiced otherwise than as specifically described without departing from the spirit and the scope of the invention as set forth in the appended claims.

What is claimed is:

1. In a matrix array processor, a segregratable elemental processor comprising:
   (a) a plurality of modules, each including means for performing at least one of a number of generalized logic functions on data;
   (b) a data bus operatively associated with each of said modules for the tranfer of data therebetween, said data bus including a data bus line, each of said mddules including means for transferring data to and from said data bus line at given points along said data bus line;
   (c) a pseudo-module operatively associated with said data bus at a given segregation point along said data bus line, said pseudo-module including means for effectively severing said data bus line at said given segregation point so as to block the transfer of data between any of said modules associated with respective portions of said data bus line on either side of said given segregation point.

2. The device of claim 1 wherein said severing means is comprised of a semiconductor switch responsive to an activation signal, said switch being electrically interposed between the respective portions of said data bus line at said given segregation point.

3. The device of claim 2 wherein said switch is a semiconductor bilateral switch that electrically opens in response to the application of said activation signal.

4. A segragatable array processor that is operatively responsive to a control processor for processing two-dimensional arrays of data, said array processor comprising:
   (a) plurality of functional planes, each said plane including an array of functional modules, each said module including means for performing a given one of a number of generalized logic functions on data, corresponding ones of said modules of said functional planes being associated so as to form a plurality of elemental processors, each said elemental processor being further associated with means for transferring data between its respective ones of said modules, each said data transferring means including a data bus line; and
   (b) a segregator plane including an array of pseudo-modules corresponding to the arrays of said functional modules, each said pseudo-module being associated with a respective one of said data transferring means and including means for functionally severing its respective data bus line in response to a given activation signal so as to effectively electrically isolate the respective portions of said data bus line whereby the respective corresponding segments of each of said elemental processors are segregated from one another in response to the application of said activation signal.

5. The device of claim 4 further comprising a plurality of said segregator planes, each responsive to a respective activation signal, such that each of said elemental processors are segregated into respectively corresponding segments in response to the specific ones of said activation signals applied.

6. The device of claim 5 further comprising:
   (a) means for transferring control signals from said control processor to each of said functional planes and said segregator plane;
   (b) means for functionally severing said control means into portions corresponding to the segregatable portions of said array processor, said severing means being associated with said segregator plane and responsive to a sever control signal provided thereto, said control processor being electrically connected to a given respective segregatable portion of said control means; and
   (c) a slave control processor associated with a given respective segregatable portion of said control means, such that the corresponding portion of said array processor is operatively responsive to said slave control processor when said sever control signal is applied to said sever means and said given activation signal is applied to said functional plane.

7. An array processor, responsive to a control processor, comprising a plurality of elemental processors operatively arranged parallel to one another in a matrix array, wherein each elemental processor is comprised of a plurality of modules interconnected by a common bus line for purposes of transferring data therein between, each of said modules including means for performing one of a number of generalized logic functions, and wherein the improvement comprises a plurality of pseudo-modules distributed throughout said array processor such that at least one said pseudo-module is present in each said elemental processor, each said pseudo-module including means for functionally severing at a given point the data bus line associated with its respective one of said elemental processors so as to effectively segment said elemental processor at least with respect to the transfer of data between the modules associated with the respective segments of said functionally severed data bus line, each said functionally severing means being responsive to said control processor by the provision of a respective activation signal therefrom to each said functionally severing means.

8. The array processor of claim 7 further characterized in that said pseudo-modules are correspondingly distributed in each of said elemental processors such that said elemental processors may be correspondingly segmented with respect to a given set of said pseudo-modules whereby each corresponding segment of said elemental processors includes a like number and logic function type of said modules.

9. The array processor of claim 8 further characterized in that said respective activation signals provided to said pseudo-modules are provided in common to all of said pseudo-modules of said given set of pseudo-modules so that a corresponding portion of said array processor is segregated from the remainder at least with respect to the intra-array processor transfer of data therebetween.

* * * * *